US009717087B2

(12) United States Patent
Zhang et al.

(10) Patent No.: US 9,717,087 B2
(45) Date of Patent: Jul. 25, 2017

(54) TECHNIQUES FOR TRANSMITTING DATA OVER AN UNLICENSED RADIO FREQUENCY SPECTRUM BAND IN ACCORDANCE WITH AN AGREEMENT BETWEEN OPERATORS

(71) Applicant: QUALCOMM Incorporated, San Diego, CA (US)

(72) Inventors: Xiaoxia Zhang, San Diego, CA (US); Tao Luo, San Diego, CA (US); Jun Wang, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 91 days.

(21) Appl. No.: 14/640,301

(22) Filed: Mar. 6, 2015

(65) Prior Publication Data
US 2015/0305037 A1 Oct. 22, 2015

Related U.S. Application Data

(60) Provisional application No. 61/980,980, filed on Apr. 17, 2014.

(51) Int. Cl.
H04W 16/14 (2009.01)
H04W 72/04 (2009.01)
H04W 72/12 (2009.01)

(52) U.S. Cl.
CPC ....... *H04W 72/0453* (2013.01); *H04W 16/14* (2013.01); *H04W 72/0406* (2013.01); *H04W 72/1263* (2013.01)

(58) Field of Classification Search
None
See application file for complete search history.

(56) References Cited

U.S. PATENT DOCUMENTS

| 8,615,250 B2 * | 12/2013 | Xing | H04W 16/14 370/231 |
| 2012/0134314 A1 * | 5/2012 | Zhang | H04W 72/005 370/312 |

(Continued)

FOREIGN PATENT DOCUMENTS

| WO | WO-2013129986 A1 | 9/2013 |
| WO | WO-2013131257 A1 | 9/2013 |
| WO | WO-2015026553 A1 | 2/2015 |

OTHER PUBLICATIONS

Beluri et al., "Mechanisms for LTE Coexistence in TV White Space," 2012 IEEE International Symposium on Dynamic Spectrum Access Networks (DYSPAN), Bellevue, WA, Oct. 16-19, 2012, pp. 317-326, XP_32342357A, Institute of Electrical and Electronics Engineers.

(Continued)

*Primary Examiner* — Hassan Kizou
*Assistant Examiner* — Hashim Bhatti
(74) *Attorney, Agent, or Firm* — Liem T. Do

(57) ABSTRACT

Techniques are described for wireless communication. A first method includes performing a clear channel assessment (CCA) for a first node associated with a first operator in a deployment of operators over an unlicensed radio frequency spectrum band, and transmitting data over the unlicensed radio frequency spectrum band when the CCA is successful. The data may be transmitted by the first node in accordance with an agreement between the first operator and a second operator in the deployment of operators. A second method includes receiving over an unlicensed radio frequency spectrum band, at a user equipment (UE), a first transmission from a first node associated with a first operator in a (Continued)

deployment of operators. The first transmission may include data originating from a second operator in the deployment of operators.

27 Claims, 19 Drawing Sheets

(56) References Cited

U.S. PATENT DOCUMENTS

| | | | | |
|---|---|---|---|---|
| 2013/0165134 A1* | 6/2013 | Touag | ............... | H04W 72/0486 455/452.1 |
| 2013/0178225 A1* | 7/2013 | Xing | ..................... | H04W 16/14 455/454 |
| 2014/0287769 A1* | 9/2014 | Taori | ................. | H04W 74/0808 455/450 |
| 2014/0301351 A1* | 10/2014 | Gao | ...................... | H04W 74/08 370/329 |
| 2015/0063188 A1* | 3/2015 | Kanesalingam | .... | H04W 72/005 370/312 |
| 2015/0327297 A1* | 11/2015 | Nilsson | ............. | H04W 72/1215 370/336 |

OTHER PUBLICATIONS

ISA/EPO, International Search Report and Written Opinion of the International Searching Authority, Int'l Appl. No. PCT/US2015/019438, Jul. 7, 2015, European Patent Office, Rijswijk, NL, 14 pgs.
QUALCOMM Incorporated, "Candidate Solutions for LAA-LTE," 3GPP TSG RAN WG1 #79, R1-145084, San Francisco, USA, Nov. 17-21, 2014, 7 pgs., XP_50876118A, 3rd Generation Partnership Project.

* cited by examiner

1800

Receiving over an unlicensed radio frequency spectrum band, at a user equipment (UE), a first transmission from a first node associated with a first operator in a deployment of operators; wherein the first transmission comprises data originating from a second operator in the deployment of operators  1805

FIG. 18

TECHNIQUES FOR TRANSMITTING DATA OVER AN UNLICENSED RADIO FREQUENCY SPECTRUM BAND IN ACCORDANCE WITH AN AGREEMENT BETWEEN OPERATORS

CROSS REFERENCES

The present Application for Patent claims priority to U.S. Provisional Patent Application No. 61/980,980 by Zhang et al., entitled "Techniques For Transmitting Data Over An Unlicensed Radio Frequency Spectrum Band In Accordance With An Agreement Between Operators," filed Apr. 17, 2014, assigned to the assignee hereof, and expressly incorporated by reference herein.

BACKGROUND

Field of the Disclosure

The present disclosure, for example, relates to wireless communication systems, and more particularly to techniques for transmitting data over an unlicensed radio frequency spectrum band in accordance with an agreement between operators.

Description of the Related Art

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple user equipments (UEs). A base station may communicate with UEs on downlink channels (e.g., for transmissions from a base station to a UE) and uplink channels (e.g., for transmissions from a UE to a base station).

Some modes of communication may enable communications with a UE over different radio frequency spectrum bands (e.g., a licensed radio frequency spectrum band and/or an unlicensed radio frequency spectrum band) of a cellular network. With increasing data traffic in cellular networks, the offloading of at least some data traffic to an unlicensed radio frequency spectrum band may provide a cellular operator with opportunities for enhanced data transmission capacity. Prior to gaining access to and transmitting data over the unlicensed radio frequency spectrum band, a transmitting apparatus may, in some examples, perform a listen before talk (LBT) procedure to gain access to the unlicensed radio frequency spectrum band. An LBT procedure may include performing a clear channel assessment (CCA) to determine whether a channel of the unlicensed radio frequency spectrum band is available. When it is determined that the channel of the unlicensed radio frequency spectrum band is not available (e.g., because another device is already using the channel of the unlicensed radio frequency spectrum band), a CCA may be performed for the channel again at a later time.

The unreliable nature of obtaining access to an unlicensed radio frequency spectrum band can make the transmission of data over the unlicensed radio frequency spectrum band unpredictable. Such unpredictability can be especially difficult for multicast-broadcast transmissions such as streaming transmissions and/or emergency transmissions.

SUMMARY

The present disclosure, for example, relates to one or more techniques for transmitting data over an unlicensed radio frequency spectrum band in accordance with an agreement between operators. Some of the techniques described herein may enable a coordinated transmission over an unlicensed radio frequency spectrum band by two or more operators. In some examples, one or more of the operators that are part of the agreement between operators may transmit data subject to the agreement whenever they have access to the unlicensed radio frequency spectrum band and are able to transmit the data (e.g., during a multicast-broadcast single-frequency network (MBSFN)) frame. In other examples, one or more of the operators that are part of the agreement between operators may transmit data subject to the agreement opportunistically, when another of the operators also transmits the data, and/or when another of the operators cannot transmit the data (e.g., because the operator cannot gain access to the unlicensed radio frequency spectrum band).

In a first set of illustrative examples, a method of wireless communication is described. In one example, the method may include performing a clear channel assessment (CCA) for a first node associated with a first operator in a deployment of operators over an unlicensed radio frequency spectrum band, and transmitting data over the unlicensed radio frequency spectrum band when the CCA is successful. The data may be transmitted by the first node in accordance with an agreement between the first operator and a second operator in the deployment of operators.

In some examples, the method may include coordinating the transmission of the data between the first node and a second node associated with the second operator. In some examples, the method may include determining, by the first node, a location of the CCA for a frame associated with the transmission of the data. The location of the CCA for the frame may be the same for the first node and the second node.

In some examples of the method, the first node may transmit the data when a CCA of the second node for a frame associated with the transmission of the data from the second operator fails. In some examples of the method, the first node may transmit the data concurrent to a transmission of the data by the second node when a CCA of the second node for a frame associated with the transmission of the data succeeds.

In some examples of the method, the first node may use a multicast channel (MCCH) configuration to transmit the data. The MCCH configuration may be common to the first node and the second node. In some examples of the method, the first node may use a synchronization protocol data unit (SYNC PDU) to transmit the data. The SYNC PDU may be common to the first node and the second node. In some examples of the method, the transmission of the data may be part of at least one of a multimedia broadcast multicast service (MBMS) transmission, a unicast transmission, or a coordinated multipoint (CoMP) transmission by the first node and the second node.

In some examples, the method may include determining, by the first node and based on a transmission status of the second node, whether to transmit the data during a frame of the unlicensed radio frequency spectrum band for which the CCA is successful, based on a transmission status of the second node. In some examples, the data may be transmitted by the first node during the frame in response to detecting a transmission of the data by the second node. In some examples, the method may include transmitting the data by the first node during the frame in response to detecting an absence of a transmission by the second node of the data during the frame.

In some examples, at least one of the first node or the second node may include a Long Term Evolution (LTE) enhanced NodeB (eNB).

In some examples of the method, the agreement between the first operator and the second operator may define a proportion of a bandwidth of the first node that is allocated to transmit the data. In some examples of the method, the agreement between the first operator and the second operator may include at least one of a predefined agreement or an opportunistic agreement.

In some examples, the method may include receiving, by the first node, information about the transmission of the data. The information may be received from at least one of an operation, administration, and maintenance (OAM) server, a multicast coordination entity of the first operator communicatively coupled with the second operator, a second node associated with the second operator, a third node associated with the first operator, a service information bulletin transmitted by the second node, or a multicast channel transmitted by the second node. In some of these examples, the information about the transmission of the data may include at least one of the data or configuration data for the transmission of the data.

In some examples of the method, the first operator and the second operator may include different public land mobile networks (PLMNs).

In a second set of illustrative examples, an apparatus for wireless communication is described. In one example, the apparatus may include means for performing a CCA for a first node associated with a first operator in a deployment of operators over an unlicensed radio frequency spectrum band, and means for transmitting data over the unlicensed radio frequency spectrum band when the CCA is successful. The data may be transmitted by the first node in accordance with an agreement between the first operator and a second operator in the deployment of operators. In some examples, the apparatus may further include means for implementing one or more aspects of the method for wireless communication described above with respect to the first set of illustrative examples.

In a third set of illustrative examples, another apparatus for wireless communication is described. In one example, the apparatus may include a processor and memory coupled to the processor. The processor may be configured to perform a CCA for a first node associated with a first operator in a deployment of operators over an unlicensed radio frequency spectrum band, and to transmit data over the unlicensed radio frequency spectrum band when the CCA is successful. The data may be transmitted by the first node in accordance with an agreement between the first operator and a second operator in the deployment of operators. In some examples, the processor may be configured to implement one or more aspects of the method for wireless communication described above with respect to the first set of illustrative examples.

In a fourth set of illustrative examples, a computer program product for communication by a wireless communication apparatus in a wireless communication system is described. In one example, the computer program product may include a non-transitory computer-readable medium for storing instructions executable by a processor to cause the wireless communication apparatus to perform a CCA for a first node associated with a first operator in a deployment of operators over an unlicensed radio frequency spectrum band, and to transmit data over the unlicensed radio frequency spectrum band when the CCA is successful. The data may be transmitted by the first node in accordance with an agreement between the first operator and a second operator in the deployment of operators. In some examples, the instructions may also be executable by the processor to cause the wireless communication apparatus to implement one or more aspects of the method for wireless communication described above with respect to the first set of illustrative examples.

In a fifth set of illustrative examples, another method of wireless communication is described. In one example, the method may include receiving over an unlicensed radio frequency spectrum band, at a user equipment (UE), a first transmission from a first node associated with a first operator in a deployment of operators. The first transmission may include data originating from a second operator in the deployment of operators.

In some examples of the method, the UE may be connected to a second node associated with the second operator. In some examples, the method may include receiving scheduling information for the first transmission from the second node prior to the first transmission.

In some examples, the method may include receiving a second transmission from the second node over the unlicensed radio frequency spectrum band. The second transmission may include data originating from the second operator. In some examples, the first transmission and the second transmission may be concurrent. In some examples, at least one of the first transmission or the second transmission may be part of at least one of an MBMS transmission, a unicast transmission, or a coordinated multipoint (CoMP) transmission by the first node and the second node. In some examples, the method may include receiving a first portion of the data from the first node during a first frame, and receiving a second portion of the data from the second node during a second frame.

In a sixth set of illustrative examples, another apparatus of wireless communication is described. In one example, the apparatus may include means for receiving over an unlicensed radio frequency spectrum band, at a UE, a first transmission from a first node associated with a first operator in a deployment of operators. The first transmission may include data originating from a second operator in the deployment of operators. In some examples, the apparatus may further include means for implementing one or more aspects of the method for wireless communication described above with respect to the fifth set of illustrative examples.

In a seventh set of illustrative examples, another apparatus for wireless communication is described. In one example, the apparatus may include a processor and memory coupled to the processor. The processor may be configured to receive over an unlicensed radio frequency spectrum band, at a UE, a first transmission from a first node associated with a first operator in a deployment of operators. The first transmission may include data originating from a second operator in the deployment of operators. In some examples, the processor may be configured to implement one or more aspects of the method for wireless communication described above with respect to the fifth set of illustrative examples.

In an eighth set of illustrative examples, a computer program product for communication by a wireless communication apparatus in a wireless communication system is described. In one example, the computer program product may include a non-transitory computer-readable medium for storing instructions executable by a processor to cause the wireless communication apparatus to receive over an unlicensed radio frequency spectrum band, at a UE, a first transmission from a first node associated with a first operator in a deployment of operators. The first transmission may include data originating from a second operator in the deployment of operators. In some examples, the instructions may also be executable by the processor to cause the wireless communication apparatus to implement one or more aspects of the method for wireless communication described above with respect to the fifth set of illustrative examples.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIG. 18 is a flow chart illustrating an example of a method of wireless communication, in accordance with various aspects of the present disclosure.

DETAILED DESCRIPTION

Figure 1:
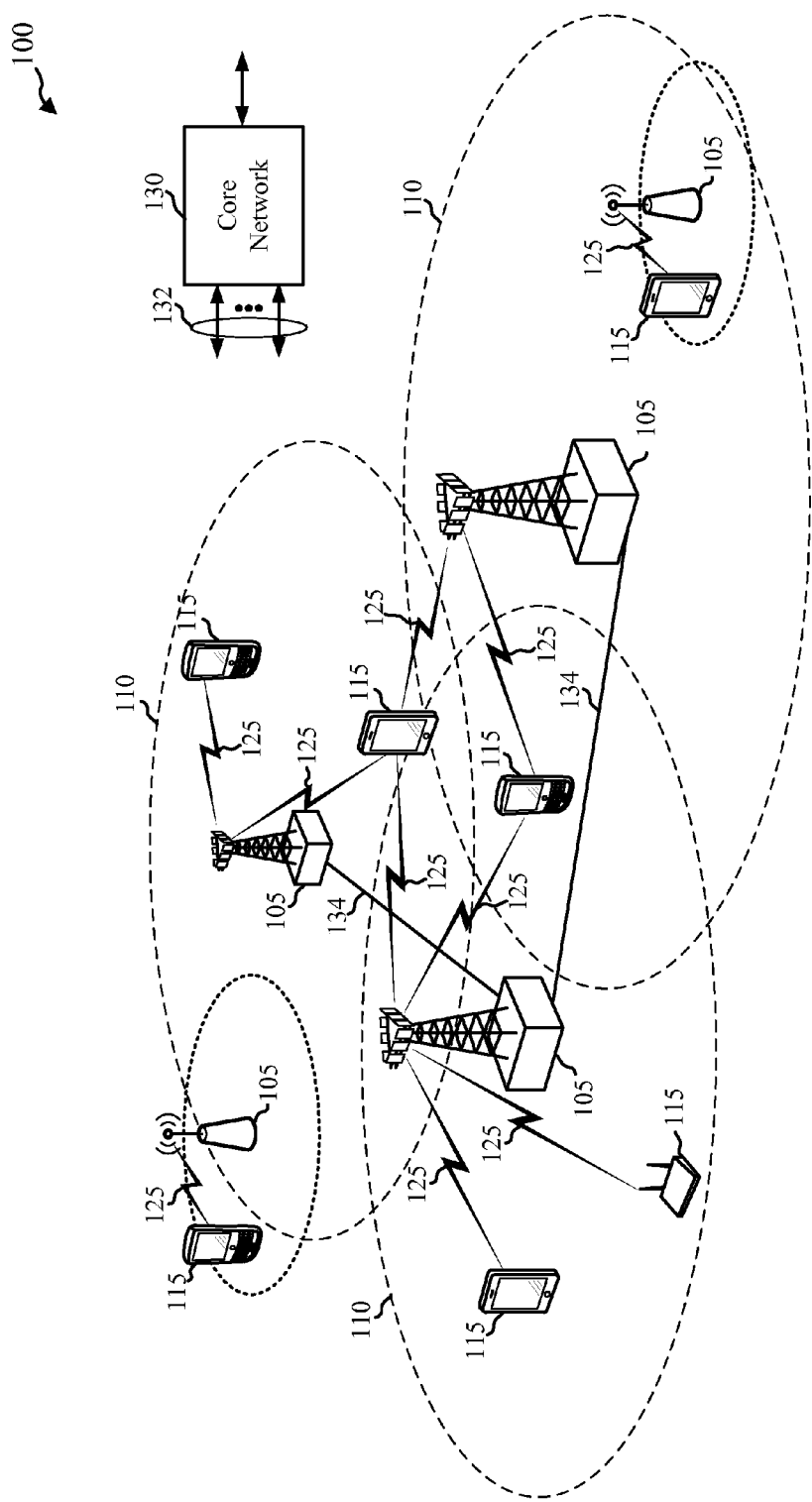
FIG. 1 shows a block diagram of a wireless communication system, in accordance with various aspects of the present disclosure.

Techniques are described in which data is transmitted over an unlicensed radio frequency spectrum band (e.g., a radio frequency spectrum band for which apparatuses may need to contend for access because the radio frequency spectrum band is available, at least in part, for unlicensed use such as Wi-Fi use and/or unlicensed Long Term Evolution (LTE)/LTE-Advanced (LTE-A) use) in accordance with an agreement between operators. In some examples, the unlicensed radio frequency spectrum band may be used for cellular communications (e.g., LTE communications and/or LTE-A communications).

With increasing data traffic in cellular networks, the offloading of at least some data traffic to an unlicensed radio frequency spectrum band may provide a cellular operator (e.g., an operator of a public land mobile network (PLMN) and/or a coordinated set of base stations defining a cellular network, such as an LTE/LTE-A network) with opportunities for enhanced data transmission capacity. In some cases, all communication between a base station and a user equipment (UE) may occur over an unlicensed radio frequency spectrum band.

Prior to gaining access to, and communicating data over, an unlicensed radio frequency spectrum band, a transmitting apparatus may, in some examples, perform a listen before talk (LBT) procedure to gain access to the unlicensed radio frequency spectrum band. Such an LBT procedure may include performing a clear channel assessment (CCA) to determine whether a channel of the unlicensed radio frequency spectrum band is available. When it is determined that a channel is not available, a CCA may be performed for the channel again at a later time. The unpredictable nature of obtaining access to an unlicensed radio frequency spectrum band can make the transmission of data over the unlicensed radio frequency spectrum band unpredictable. Such unpredictability can be especially difficult for multicast-broadcast transmissions such as streaming transmissions and/or emergency transmissions.

Some of the techniques described herein may enable a coordinated transmission over an unlicensed radio frequency spectrum band by two or more operators. In some examples, one or more of the operators that are part of the agreement between operators may transmit data subject to the agreement whenever they have access to the unlicensed radio frequency spectrum band and are able to transmit the data (e.g., during a multicast-broadcast single-frequency network (MBSFN)) frame. In other examples, one or more of the operators that are part of the agreement between operators may transmit data subject to the agreement opportunistically, when another of the operators also transmits the data, and/or when another of the operators cannot transmit the data (e.g., because the operator cannot gain access to the unlicensed radio frequency spectrum band).

In some examples, the techniques described herein may enable content sharing by different operators, to avoid duplicate transmission of the same content within a geographic area or venue. In some examples, the techniques described herein may enable the transmission of high definition (HD) and/or 4K premium services that require high bandwidth over an unlicensed radio frequency spectrum band.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

FIG. 1 shows a block diagram of a wireless communication system 100, in accordance with various aspects of the present disclosure. The wireless communication system 100 may include a plurality of base stations 105 (e.g., base stations forming parts or all of one or more evolved NodeBs (eNBs)), a number of UEs 115, and a core network 130. Some of the base stations 105 may communicate with the UEs 115 under the control of a base station controller (not shown), which may be part of the core network 130 or certain ones of the base stations 105 in various examples. Some of the base stations 105 may communicate control information and/or user data with the core network 130 through backhaul 132. In some examples, some of the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to various radio technologies. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an eNB, a Home NodeB, a Home eNodeB, a wireless local area network (WLAN) access point, a Wi-Fi node or some other suitable terminology. The coverage area 110 for a base station 105 may be divided into sectors making up only a portion of the coverage area. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

In some examples, the wireless communication system 100 may include an LTE/LTE-A communication system (or network), which LTE/LTE-A communication system may support one or more modes of operation or deployment in a licensed radio frequency spectrum band (e.g., a radio frequency spectrum band for which apparatuses do not contend for access because the spectrum band is licensed to particular users for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use). In other examples, the wireless communication system 100 may support wireless communication using one or more access technologies different from LTE/LTE-A. In LTE/LTE-A communication systems, the term evolved NodeB or eNB may be used, for example, to describe ones or groups of the base stations 105.

The wireless communication system 100 may be or include a Heterogeneous LTE/LTE-A network in which different types of base stations 105 provide coverage for various geographical regions. For example, each base station 105 may provide communication coverage for a macro cell, a pico cell, a femto cell, and/or other type of cell. Small cells such as pico cells, femto cells, and/or other types of cells may include low power nodes or LPNs. A macro cell, for example, covers a relatively large geographic area (e.g., several kilometers in radius) and may allow unrestricted access by UEs with service subscriptions with the network provider. A pico cell would, for example, cover a relatively smaller geographic area and may allow unrestricted access by UEs with service subscriptions with the network provider. A femto cell would also, for example, cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the base stations 105 via a backhaul 132 (e.g., S1 application protocol, etc.). The base stations 105 may also communicate with one another, e.g., directly or indirectly via backhaul links 134 (e.g., X2 application protocol, etc.) and/or via backhaul 132 (e.g., through core network 130). The wireless communication system 100 may support synchronous or asynchronous operation. For synchronous operation, the eNBs may have similar frame and/or gating timing, and transmissions from different eNBs may be approximately aligned in time. For asynchronous operation, the eNBs may have different frame and/or gating timing, and transmissions from different eNBs may not be aligned in time.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, etc. A UE 115 may be able to communicate with macro eNBs, pico eNBs, femto eNBs, relays, and the like. A UE 115 may also be able to communicate over different types of access networks, such as cellular or other WWAN access networks, or WLAN (e.g., Wi-Fi) access networks. In some modes of communication with a UE 115, communication may be conducted over a plurality of communication links 125 or channels (i.e., component carriers), with each channel using a component carrier between the UE 115 and one of a number of cells (e.g., serving cells, which cells may in some cases be operated by the same or different base stations 105).

Each component carrier may be provided over a licensed radio frequency spectrum band or an unlicensed radio frequency spectrum band, and a set of component carriers used in a particular mode of communication may all be received (e.g., at a UE 115) over a licensed radio frequency spectrum band, all be received (e.g., at a UE 115) over an unlicensed radio frequency spectrum band, or be received (e.g., at a UE 115) over a combination of a licensed radio frequency spectrum band and an unlicensed radio frequency spectrum band. In some examples, a plurality of base stations 105 may collaborate and/or be coordinated to provide joint multicast-broadcast single-frequency network (MBSFN) (e.g., via an evolved multimedia broadcast multicast service (eMBMS)) and/or unicast coordinated multipoint (CoMP) transmissions to one or more of the UEs 115.

The communication links 125 shown in wireless communication system 100 may include uplink channels (using component carriers) for carrying uplink (UL) communications (e.g., transmissions from a UE 115 to a base station 105) and/or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications and/or uplink communications may in some examples be made using a licensed radio frequency spectrum band, an unlicensed radio frequency spectrum band, or both.

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to an unlicensed radio frequency spectrum band, a carrier aggregation mode in which both LTE/LTE-A downlink and uplink communications may be offloaded from a licensed radio frequency spectrum band to an unlicensed radio frequency spectrum band, and/or a standalone mode in which LTE/LTE-A downlink and uplink communications between a base station 105 and a UE 115 may take place in an unlicensed radio frequency spectrum band. Base stations 105 as well as UEs 115 may in some examples support one or more of these or similar modes of operation. OFDMA waveforms may be used in the communication links 125 for LTE/LTE-A downlink communications in a licensed radio frequency spectrum band and/or an unlicensed radio frequency spectrum band, while OFDMA, SC-FDMA and/or resource block interleaved FDMA waveforms may be used in the communication links 125 for LTE/LTE-A uplink communications in a licensed radio frequency spectrum band and/or an unlicensed radio frequency spectrum band.

At times, different operators of the base stations 105 and/or UEs 115 of the wireless communication system 100 may agree to cooperate in transmitting data to their respective UEs 115. In some examples, the data subject to the agreement may include, for example, emergency data (e.g., amber alerts, weather alerts, tsunami alerts), broadcast data (e.g., data pertaining to a broadcast sporting event), etc. In some examples, the data subject to the agreement may be provided to the UEs 115 via joint MBSFN (e.g., via an eMBMS) and/or unicast CoMP transmissions of the base stations 105 of the different operators. In some examples, the data subject to the agreement may be provided over an unlicensed radio frequency spectrum band by the base stations 105 of the different operators.

Figure 2:
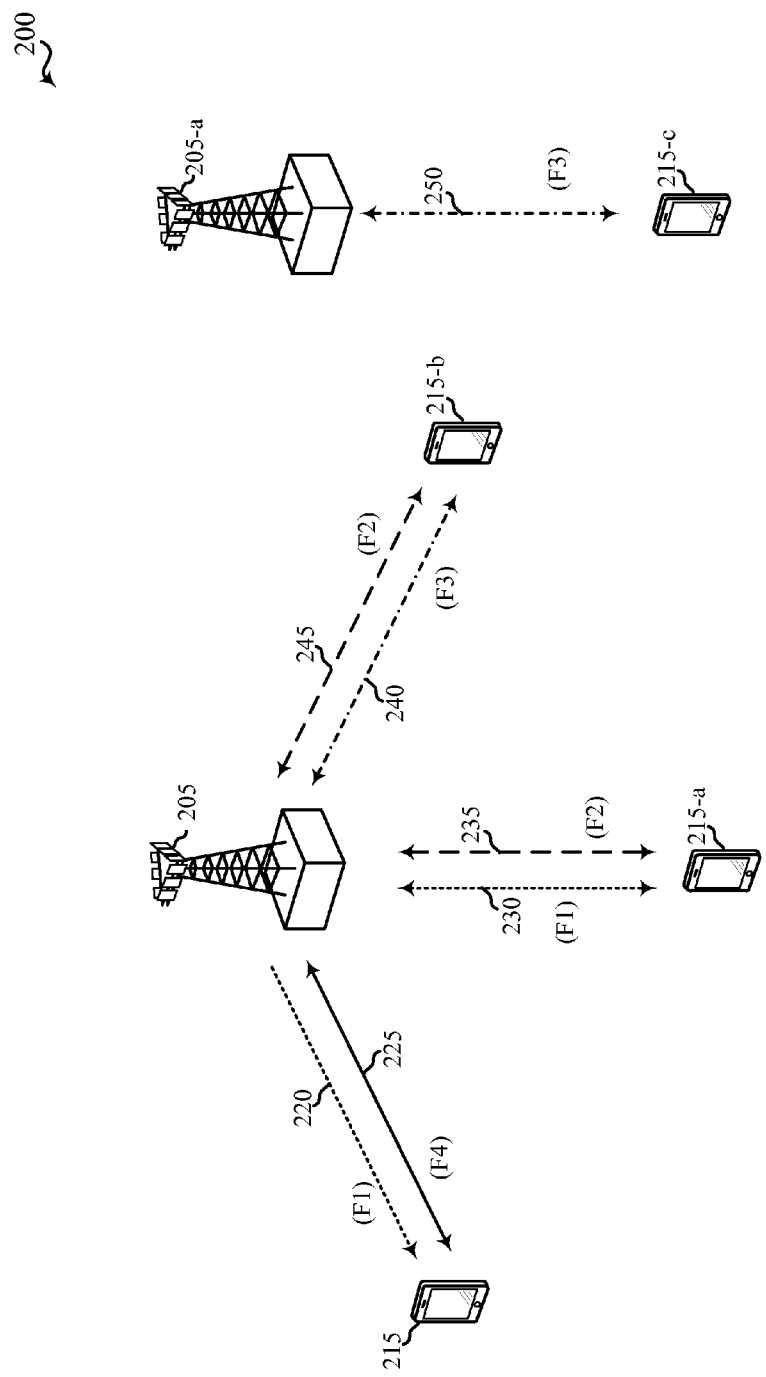
FIG. 2 shows a wireless communication system in which Long Term Evolution (LTE)/LTE-Advanced (LTE-A) is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-a may be examples of aspects of one or more of the base stations 105 described with reference to FIG. 1, while a first UE 215, a second UE 215-a, a third UE 215-b, and a fourth UE 215-c may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). In some examples, the downlink channel 220 may be used to transmit emergency data from the first base station 205 to the UE 215. A supplemental downlink scenario may occur with any service provider (e.g., a mobile network operator (MNO)) that uses a licensed radio frequency spectrum and needs to relieve some of the traffic and/or signaling congestion.

In one example of a carrier aggregation mode in the wireless communication system 200, the first base station 205 may transmit OFDMA waveforms to the second UE 215-a using a second bidirectional link 230 and may receive OFDMA waveforms, SC-FDMA waveforms, and/or resource block interleaved FDMA waveforms from the second UE 215-a using the second bidirectional link 230. The second bidirectional link 230 may be associated with the frequency F1 in the unlicensed radio frequency spectrum band. The first base station 205 may also transmit OFDMA waveforms to the second UE 215-a using a third bidirectional link 235 and may receive SC-FDMA waveforms from the second UE 215-a using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic and/or signaling congestion.

In another example of a carrier aggregation mode in the wireless communication system 200, the first base station 205 may transmit OFDMA waveforms to the third UE 215-b using a fourth bidirectional link 240 and may receive OFDMA waveforms, SC-FDMA waveforms, and/or resource block interleaved waveforms from the third UE 215-b using the fourth bidirectional link 240. The fourth bidirectional link 240 may be associated with a frequency F3 in the unlicensed radio frequency spectrum band. The first base station 205 may also transmit OFDMA waveforms to the third UE 215-b using a fifth bidirectional link 245 and may receive SC-FDMA waveforms from the third UE 215-b using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in licensed radio frequency spectrum and shared access radio frequency spectrum for capacity offload.

As described above, one type of service provider that may benefit from the capacity offload offered by using LTE/LTE-A in shared access radio frequency spectrum is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). When there is a need to transmit emergency data between the first base station 205 and the second UE 215-a or third UE 215-b, the emergency data may be transmitted over the licensed radio frequency spectrum band and/or the unlicensed radio frequency spectrum band. The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, and/or resource block interleaved FDMA waveforms from the fourth UE 215-*c* using the bidirectional link 250. The bidirectional link 250 may be associated with the frequency F3 in the unlicensed radio frequency spectrum band. When there is a need to transmit emergency data between the second base station 205-*a* and the fourth UE 215-*c*, the emergency data may need to be transmitted over the unlicensed radio frequency spectrum band because transmission of the emergency data over a licensed radio frequency spectrum band may not be an option. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

Figure 3:
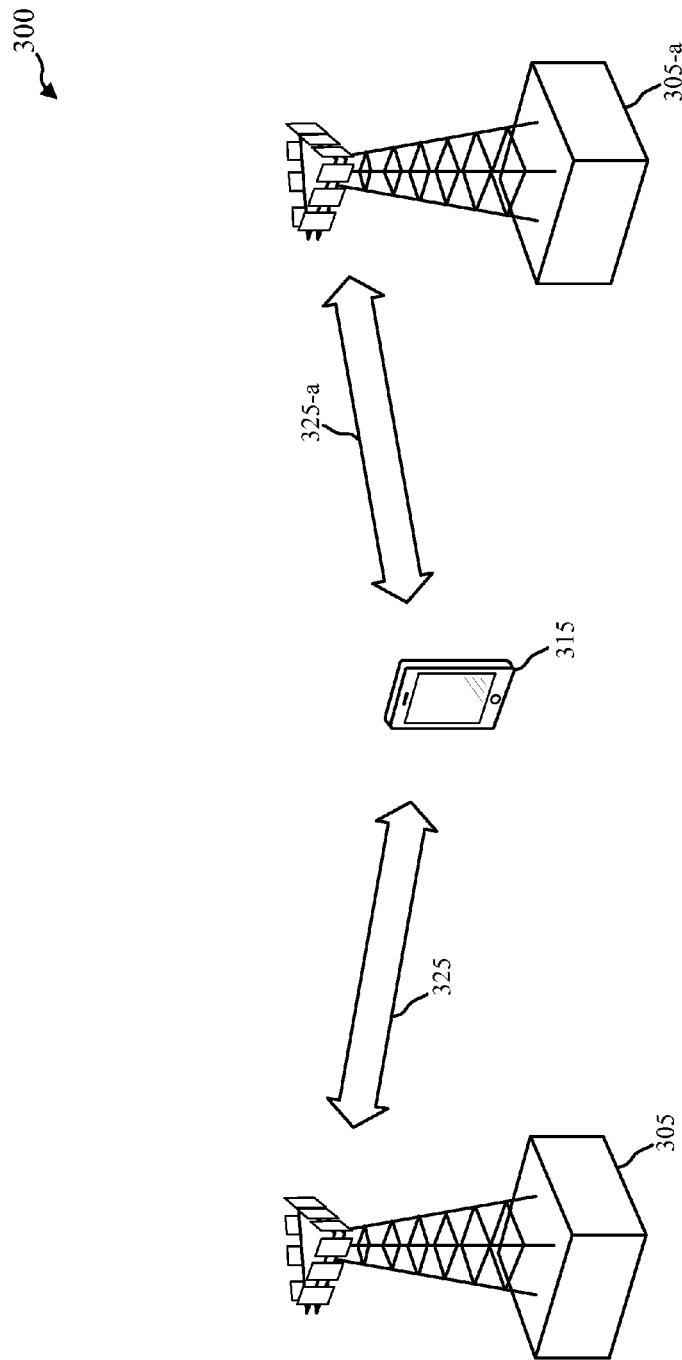
FIG. 3 shows a wireless communication system in which LTE/LTE-A is deployed over an unlicensed radio frequency spectrum band by two different operators (e.g., a first operator and a second operator) operating in accordance with an agreement between the operators, in accordance with various aspects of the present disclosure.

FIG. 3 shows a wireless communication system 300 in which LTE/LTE-A is deployed over an unlicensed radio frequency spectrum band by two different operators (e.g., a first operator and a second operator) operating in accordance with an agreement between the operators, in accordance with various aspects of the present disclosure. More specifically, FIG. 3 shows a first base station 305 that functions as part or all of a first node associated with a first operator, and a second base station 305-*a* that functions as part or all of a second node associated with a second operator. In some examples, each of the first base station 305 and the second base station 305-*a* may be part of a respective eNB that serves as the first node or the second node. In some examples, the first operator and the second operator may be or include different PLMNs.

In some examples, the agreement between the first operator and the second operator may include a predefined agreement and/or an opportunistic agreement. A predefined agreement may specify, in some examples, that the first operator (and/or one or more nodes of the first operator including the first node and the first base station 305) will attempt to transmit data subject to the agreement when a node of the first operator (e.g., the first node, including the first base station 305) gains access to the unlicensed radio frequency spectrum band and is able to transmit the data subject to the agreement (e.g., when the first base station 305 gains access to the unlicensed radio frequency spectrum band during an MBSFN frame). An opportunistic agreement may specify, in some examples, that the first operator (and/or one or more nodes of the first operator including the first node and the first base station 305) will attempt to opportunistically transmit data subject to the agreement to assist the second operator. An opportunistic agreement may in some cases be based on a transmission status (or statuses) of one or more nodes (e.g., a second node including the second base station 305-*a*) of the second operator. For example, an opportunistic agreement may specify that a node of the first operator (e.g., the first node, including the first base station 305) will attempt to transmit data subject to the agreement 1) when the node of the first operator gains access to the unlicensed radio frequency spectrum band and is able to transmit data subject to the agreement (e.g., when the first node gains access to the unlicensed radio frequency spectrum band during an MBSFN frame), and 2) during a frame for which the node of the first operator has detected that a node of the second operator (e.g., the second node, including the second base station 305-*a*) has transmitted, is transmitting, or will be transmitting data subject to the agreement. As another example, an opportunistic agreement may specify that a node of the first operator (e.g., the first node, including the first base station 305) will attempt to transmit data subject to the agreement 1) when the node of the first operator gains access to the unlicensed radio frequency spectrum band and is able to transmit data subject to the agreement (e.g., when the first node gains access to the unlicensed radio frequency spectrum band during an MBSFN frame), and 2) during a frame for which the node of the first operator has detected that a node of the second operator (e.g., the second node, including the second base station 305-*a*) has not transmitted, is not transmitting, and will not be transmitting data subject to the agreement.

In some examples, the transmission of data subject to the agreement between the first operator and the second operator may be part of at least one of an MBMS transmission and/or a CoMP transmission by the first node and the second node.

In some examples, the first node (including the first base station 305) may receive information about a transmission of data over the unlicensed radio frequency band, which data is to be transmitted in accordance with the agreement between the first operator and a second operator. In some examples, the information about the transmission of the data may be received from at least one of an operation, administration, and maintenance (OAM) server, a multicast coordination entity of the first operator communicatively coupled with the second operator, a second node associated with the second operator, a third node associated with the first operator, a service information bulletin transmitted by the second node, or a multicast channel transmitted by the second node. In some examples, the information about the transmission of the data may include at least one of the data which is to be transmitted subject to the agreement, or configuration data for the transmission of the data.

In some examples, the first node (including the first base station 305) may receive a static configuration, via an OAM server, for transmitting data over the unlicensed radio frequency spectrum band in accordance with an agreement between operators. In some examples, the static configuration may include a static MBSFN configuration that is preconfigured for operators (e.g., PLMNs) in a geographic area. The static MBSFN configuration may specify, for example, that 30% of a frequency bandwidth be allocated to data subject to the agreement on subframes 1, 2, and 3 with preconfigured MBSFN configurations (e.g., a preconfigured modulation and coding scheme (MCS), etc.). The static MBSFN configuration may also specify, for example, that a broadcast-multicast service center (BM-SC) and/or MBMS gateway (MBMS-GW) be shared among the operators subject to an agreement. The static MBSFN configuration may also specify, for example, use of a preconfigured common MCCH, and/or that all nodes across operators subject to an agreement will join a multicast tree from a particular MBMS-GW. The static MBSFN configuration may also specify that resources reserved for the transmission of data subject to an agreement between operators may be used for unicast service when not used for an MBMS service. A static MBSFN configuration as described in the above example may be suitable, for example, to the broadcast of a sporting event in a stadium.

In some examples, the first node (including the first base station 305) may receive a dynamic configuration for transmitting data over the unlicensed radio frequency spectrum band in accordance with an agreement between operators. In some examples, the dynamic configuration may include a dynamic MBSFN configuration sent via an inter-operator (e.g., inter-PLMN) interface (e.g., an inter-multi-cell/multicast coordination entity (e.g., inter-MCE) interface, an inter-management entity (e.g., inter-MME (mobility management entity)) interface, and/or an inter-MCE-eNBs interface). A primary MCE may send the dynamic MBSFN configuration to all nodes subject to an agreement between operators. Other nodes may join the multicast tree from a particular MBMS-GW upon receiving the dynamic MBSFN configuration. A dynamic MBSFN configuration as described in the above example may be suitable, for example, to a broadcast of emergency data (e.g., breaking news, an emergency alert, etc.).

In some examples, the first node (including the first base station 305) may operate similarly to a UE and listen to a system information block (SIB) and/or multicast control channel (MCCH) to obtain a configuration for transmitting data over the unlicensed radio frequency spectrum band in accordance with an agreement between operators. In these examples, a secondary node (e.g., a node including the first base station 305) may listen for an MBSFN configuration transmitted by a primary node (e.g., a node including the second base station 305-*a*), and the secondary node may join a multicast tree from a particular MBMS-GW upon receiving the MBSFN configuration.

In some examples, a combination of the afore-mentioned techniques may be implemented for receiving a configuration for transmitting data over the unlicensed radio frequency spectrum band in accordance with an agreement between operators.

In some examples, the first node (including the first base station 305) may receive a dynamic configuration for transmitting CoMP data over the unlicensed radio frequency spectrum band in accordance with an agreement between operators. In some examples, the dynamic configuration may include a dynamic CoMP configuration sent between the nodes (e.g., eNBs) of different operators over an X2 interface. To allow time to acquire the dynamic CoMP configuration, the dynamic CoMP configuration may be better targeted for later subframes in an LBT frame. Once an operator acquires the channel over which the dynamic CoMP configuration is transmitted, it may send the dynamic CoMP configuration to adjacent nodes of other operators subject to the agreement.

In some examples, a transmitting apparatus such as one of the base stations 105, 205, 205-*a*, 305, and/or 305-*a* described with reference to FIG. 1, 2, and/or 3, and/or one of the UEs 115, 215, 215-*a*, 215-*b*, 215-*c*, and/or 315 described with reference to FIG. 1, 2, and/or 3, may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based on the LBT protocol specified in ETSI (EN 301 893). When using a gating interval that defines the application of an LBT protocol, the gating interval may indicate when a transmitting apparatus needs to perform a contention procedure, such as a clear channel assessment (CCA). The outcome of the CCA may indicate to the transmitting apparatus whether a channel of an unlicensed radio frequency spectrum band is available or in use during the gating interval (also referred to as an LBT frame or a CCA frame). When a CCA indicates that the channel is available (e.g., "clear" for use) during a corresponding LBT frame, the transmitting apparatus may reserve and/or use the channel of the unlicensed radio frequency spectrum band during part or all of the LBT frame. When the CCA indicates that the channel is not available (e.g., that the channel is in use or reserved by another apparatus), the transmitting apparatus may be prevented from using the channel during the LBT frame.

In some cases, it may be useful for a transmitting apparatus to generate a gating interval on a periodic basis and synchronize at least one boundary of the gating interval with at least one boundary of a periodic frame structure (e.g., a periodic LTE/LTE-A radio frame structure). Examples of such synchronization are shown in FIG. 4.

Figure 4:
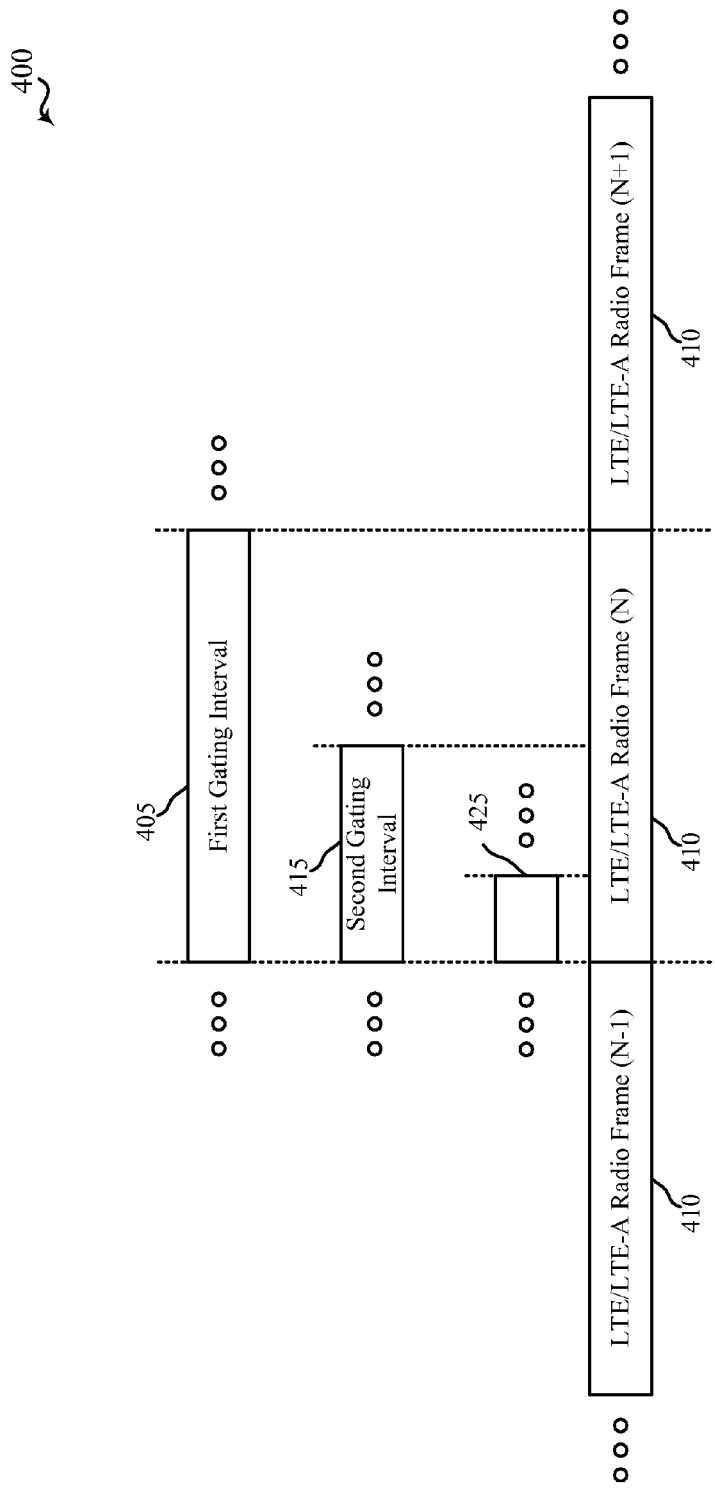
FIG. 4 shows examples of a gating interval (or listen-before-talk (LBT) frame) in an unlicensed radio frequency spectrum band, in accordance with various aspects of the present disclosure.

FIG. 4 shows examples 400 of a gating interval (or LBT frame) in an unlicensed radio frequency spectrum band, in accordance with various aspects of the present disclosure. A first gating interval 405, a second gating interval 415, and/or a third gating interval 425 may be used as a periodic gating interval by an eNB or UE that supports transmissions over the unlicensed radio frequency spectrum band. Examples of such an eNB may include the base station 105, 205, 205-*a*, 305, and/or 305-*a* described with reference to FIG. 1, 2, and/or 3, and examples of such a UE may include the UE 115, 215, 215-*a*, 215-*b*, 215-*c*, and/or 315 described with reference to FIG. 1, 2, and/or 3. The first gating interval 405, the second gating interval 415, and/or the third gating interval 425 may in some examples be used with the wireless communication system 100, 200, and/or 300 described with reference to FIG. 1, 2, and/or 3.

By way of example, the duration of the first gating interval 405 is shown to be equal to (or approximately equal to) a duration of an LTE/LTE-A radio frame 410 of a periodic frame structure associated with a cellular downlink. In some examples, "approximately equal" means the duration of the first gating interval 405 is within a cyclic prefix (CP) duration of the duration of the periodic frame structure.

At least one boundary of the first gating interval 405 may be synchronized with at least one boundary of the periodic frame structure that includes the LTE/LTE-A radio frames N−1 to N+1. In some cases, the first gating interval 405 may have boundaries that are aligned with the frame boundaries of the periodic frame structure. In other cases, the first gating interval 405 may have boundaries that are synchronized with, but offset from, the frame boundaries of the periodic frame structure. For example, the boundaries of the first gating interval 405 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 410 may have a duration of ten milliseconds, for example, and the first gating interval 405 may also have a duration of ten milliseconds. In these cases, the boundaries of the first gating interval 405 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the durations of the second gating interval 415 and the third gating interval 425 are shown to be sub-multiples of (or approximate sub-multiples of) the duration of the periodic frame structure associated with the cellular downlink. In some examples, an "approximate sub-multiple of" means the duration of the second gating interval 415 and/or the third gating interval 425 is within a cyclic prefix (CP) duration of the duration of a sub-multiple of (e.g., half or one-fifth) the periodic frame structure. For example, the second gating interval 415 may have a duration of five milliseconds and the third gating interval 425 may have a duration of two milliseconds. The second gating interval 415 or the third gating interval 425 may be advantageous over the first gating interval 405 because its shorter duration may facilitate more frequent sharing of the unlicensed radio frequency spectrum band.

Figure 5:
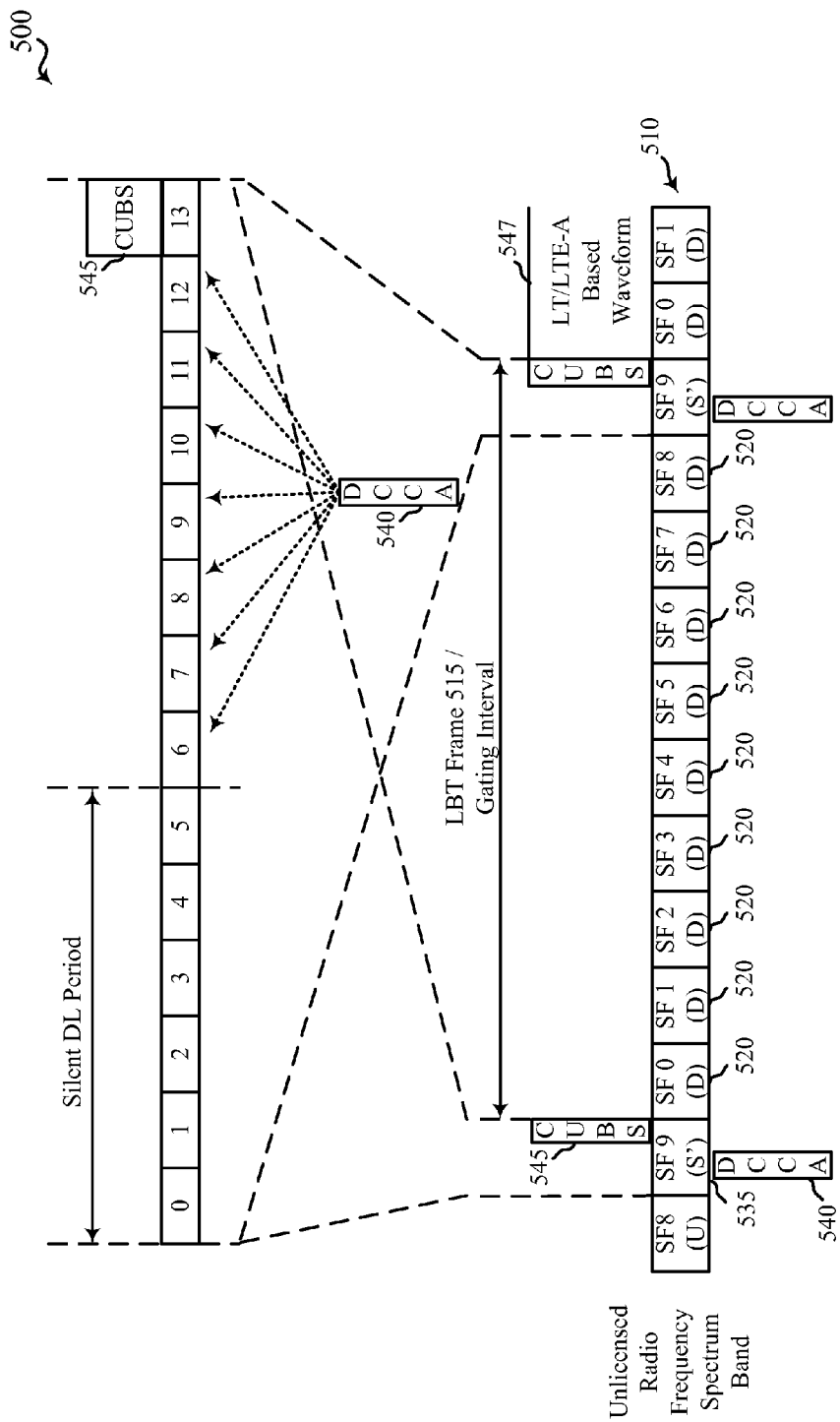
FIG. 5 shows an example of wireless communication over an unlicensed radio frequency spectrum band, in accordance with various aspects of the present disclosure.

FIG. 5 shows an example 500 of wireless communication 510 over an unlicensed radio frequency spectrum band, in accordance with various aspects of the present disclosure. An LBT frame 515, which may correspond to a gating interval such as the first gating interval 405 described with reference to FIG. 4, may have a duration of ten milliseconds and include a number of downlink subframes 520 and a special S' subframe 535. The S' subframe 535 may provide a CCA opportunity for a subsequent LBT frame 515.

During the S' subframe 535, a downlink clear channel assessment (DCCA) 540 may be performed by one or more base stations, such as one or more of the base stations 105, 205, 205-a, 305, and/or 305-a described with reference to FIG. 1, 2, and/or 3, to reserve, for a period of time, the channel over which the wireless communication 510 occurs. Following a successful DCCA 540 by a base station, the base station may transmit a channel usage beacon signal (CUBS) 545 to provide an indication to other base stations and/or apparatuses (e.g., UEs, Wi-Fi access points, etc.) that the base station has reserved the channel. In some examples, a CUBS 545 may be transmitted using a plurality of interleaved resource blocks. Transmitting a CUBS 545 in this manner may enable the CUBS 545 to occupy at least a certain percentage of the available frequency bandwidth in the unlicensed radio frequency spectrum band and satisfy one or more regulatory requirements (e.g., a requirement that the CUBS 545 occupy at least 80% of the available frequency bandwidth). The CUBS 545 may in some examples take a form similar to that of an LTE/LTE-A cell-specific reference signal (CRS) and/or channel state information reference signal (CSI-RS). Following the transmission of the CUBS 545, an LTE/LTE-A based waveform 547 may be transmitted, from a base station to a UE, over the unlicensed radio frequency spectrum band.

The S' subframe 535 may include 14 OFDM symbols, numbered 0 through 13 in FIG. 5. A first portion of the S' subframe 535, symbols 0 through 5 in this example, may be used by base stations as a silent DL period (or guard period), which may be required for compatibility with LTE/LTE-A communication standards. Thus, a base station may not transmit data during the silent DL period. A second portion of the S' subframe 535 may be used for the DCCA 540. In the example 500, the S' subframe 535 includes seven DCCA opportunities, included in symbols 6 through 12. Use of the DCCA opportunities by different network operators may be coordinated to provide more efficient system operation (e.g., synchronous system operation). In some examples, in order to determine which of the seven possible DCCA opportunities to use to perform a DCCA 540, a base station 105 may evaluate a mapping-function of the form:

$$F_D(\text{GroupID}, t) \in \{1,2,3,4,5,6,7\}$$

where GroupID is a "deployment group-id" assigned to the base station 105, and t is the LBT frame number corresponding to a gating interval or frame for which the DCCA 540 is performed.

All base stations deployed by the same network operator/service-provider may be assigned the same group-id, so that they do not preempt each other in the contention process. This allows full frequency reuse among base stations associated with the same operator, leading to enhanced system throughput. Base stations associated with different operators may be assigned different group-ids, so that with orthogonal DCCA opportunity mapping, access to the channel is mutually exclusive.

In examples with non-orthogonal, or overlapping, CCA opportunity access, the mapping-function may allow more than seven group ids. In some situations, for example, it may be useful to support more than seven deployment group-ids, in which case it is not possible to maintain the orthogonality property of DCCA opportunity mapping functions. In such cases, it may be desirable to reduce the frequency of collision between any two group-ids. In some examples, non-orthogonal DCCA opportunity mapping sequences may also be used to provide fair channel access among deployments without tight coordination on LBT opportunities. One example of a non-orthogonal DCCA opportunity mapping sequence is given by:

$$F_{D/U}(x,t) = R_{1,7}(x,t)$$

$$\text{GroupID } x = \epsilon \{1,2,\ldots 2^{16}\}$$

where $R_{1,7}(x, t)$ is a pseudo-random number generator between 1 and 7 chosen independently for GroupID x. In this case, there could be potential collisions between base stations and/or UEs of different GroupIDs in the same LBT frame t.

When transmitting data over an unlicensed radio frequency spectrum band in accordance with an agreement between operators (e.g., a first operator and a second operator), an operator may select a DCCA opportunity for a frame of the unlicensed radio frequency spectrum band in which data subject to the agreement will be transmitted. In some examples, the DCCA opportunity may be selected independently or semi-independently of the DCCA opportunities selected by other operators, and in some cases may be selected using the afore-mentioned mapping-function. For example, for a first frame, the nodes (e.g., eNBs) of an Operator 1 may select a DCCA opportunity corresponding to OFDM symbol 6 in FIG. 5, the nodes of an Operator 2 may select a DCCA opportunity corresponding to OFDM symbol 7, and the nodes of an Operator 3 may select a DCCA opportunity corresponding to OFDM symbol 8. In a second frame, the nodes of the Operator 1 may select a DCCA opportunity corresponding to OFDM symbol 12, the nodes of the Operator 2 may select a DCCA opportunity corresponding to OFDM symbol 6, and the nodes of the Operator 3 may select a DCCA opportunity corresponding to OFDM symbol 7.

In other examples, an operator may coordinate the selection of a DCCA opportunity with the selection of a DCCA opportunity by another operator subject to the agreement between operators. For example, an operator may select a DCCA opportunity that is aligned with a location of a DCCA used by another operator subject to the agreement between operators. For example, assuming that the Operator 1 and the Operator 3 are subject to an agreement for transmitting data over the unlicensed radio frequency spectrum band, and for a first frame, the nodes of the Operator 1 and the Operator 3 may select a DCCA opportunity corresponding to OFDM symbol 6 in FIG. 5, and the nodes of the Operator 2 may select a DCCA opportunity corresponding to OFDM symbol 7. In a second frame, the nodes of the Operator 1 and the Operator 3 may select a DCCA opportunity corresponding to OFDM symbol 12, and the nodes of the Operator 2 may select a DCCA opportunity corresponding to OFDM symbol 6.

In some examples, an operator may use different methods and/or functions to determine a location for performing a DCCA for a frame of the unlicensed radio frequency spectrum band in which data subject to the agreement is to be transmitted (e.g., an MBSFN frame) versus a frame of the unlicensed radio frequency spectrum band in which other data is to be transmitted.

In addition to DCCA coordination between operators, other information may be coordinated between operators subject to an agreement for transmitting data. For example, the operators may determine a common multicast control channel (MCCH) configuration and/or a common synchronization protocol data unit (SYNC PDU) to use to transmit data subject to the agreement. In some examples, the MCCH configuration and/or the SYNC PDU may be determined based on signaling received via a core network (e.g., via a core network such as the core network 130 described with reference to FIG. 1) and/or via the second node.

Figure 6:
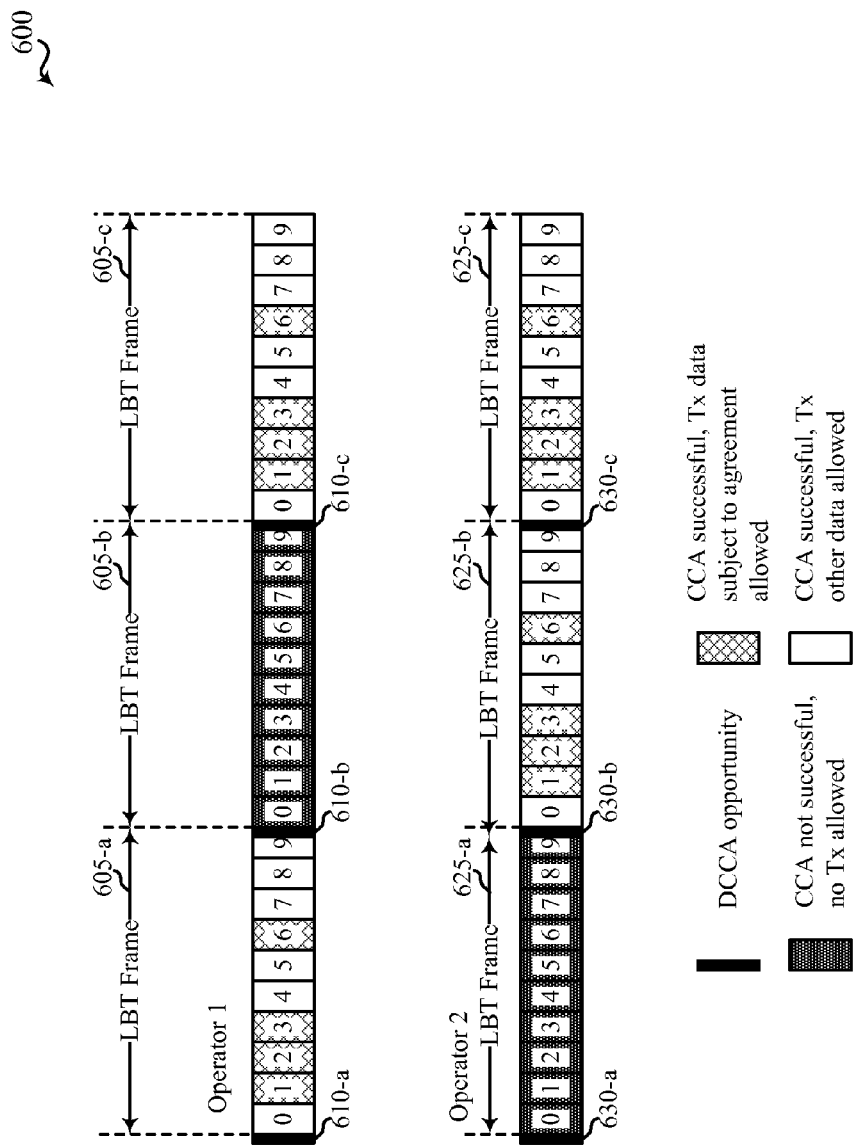
FIG. 6 shows an example of how data may be transmitted in accordance with a predefined agreement between operators, in accordance with various aspects of the present disclosure.

FIG. 6 shows an example 600 of how data may be transmitted in accordance with a predefined agreement between operators, in accordance with various aspects of the present disclosure. More particularly, FIG. 6 shows exemplary sequences of LBT frames for a first operator (e.g., LBT frames 605-a, 605-b, and 605-c for the Operator 1) and a second operator (e.g., LBT frames 625-a, 625-b, and 625-c for the Operator 2). By way of further example, data subject to the agreement between operators may be transmitted in subframes 1, 2, 3, and/or 6 of each LBT frame 605-a, 605-b, 605-c, 625-a, 625-b, and/or 625-c, which subframes may be MBSFN subframes.

During a first set of aligned DCCA opportunities 610-a and 630-a for the aligned LBT frames 605-a and 625-a, each of the Operator 1 and the Operator 2 may perform a first DCCA. By way of example, the first DCCA performed by the Operator 1 may succeed and the first DCCA performed by the Operator 2 may fail. The Operator 1 may therefore transmit data subject to the agreement between the operators in subframes 1, 2, 3, and 6 of LBT frame 605-a, while the Operator 2 may not transmit any data in any subframe of LBT frame 625-a. In a second set of aligned DCCA opportunities 610-b and 630-b for the aligned LBT frames 605-b and 625-b, each of the Operator 1 and the Operator 2 may perform a second DCCA. By way of example, the second DCCA performed by the Operator 1 may fail, and the second DCCA performed by the Operator 2 may succeed. The Operator 2 may therefore transmit data subject to the agreement in subframes 1, 2, 3, and 6 of LBT frame 625-b, while the Operator 1 may not transmit any data in any subframe of LBT frame 605-b. During a third set of aligned DCCA opportunities 610-c and 630-c for the aligned LBT frames 605-c and 625-c, each of the Operator 1 and the Operator 2 may perform a third DCCA. By way of example, the third DCCA performed by each of the Operator 1 and the Operator 2 may succeed, and each of the Operator 1 and the Operator 2 may therefore transmit data subject to the agreement between the operators in subframes 1, 2, 3, and 6 of LBT frames 605-c and 625-c. Because of the agreement between the Operator 1 and the Operator 2, data subject to the agreement may be transmitted in more LBT frames than when the data is transmitted by only one of the Operator 1 and the Operator 2.

Figure 7:
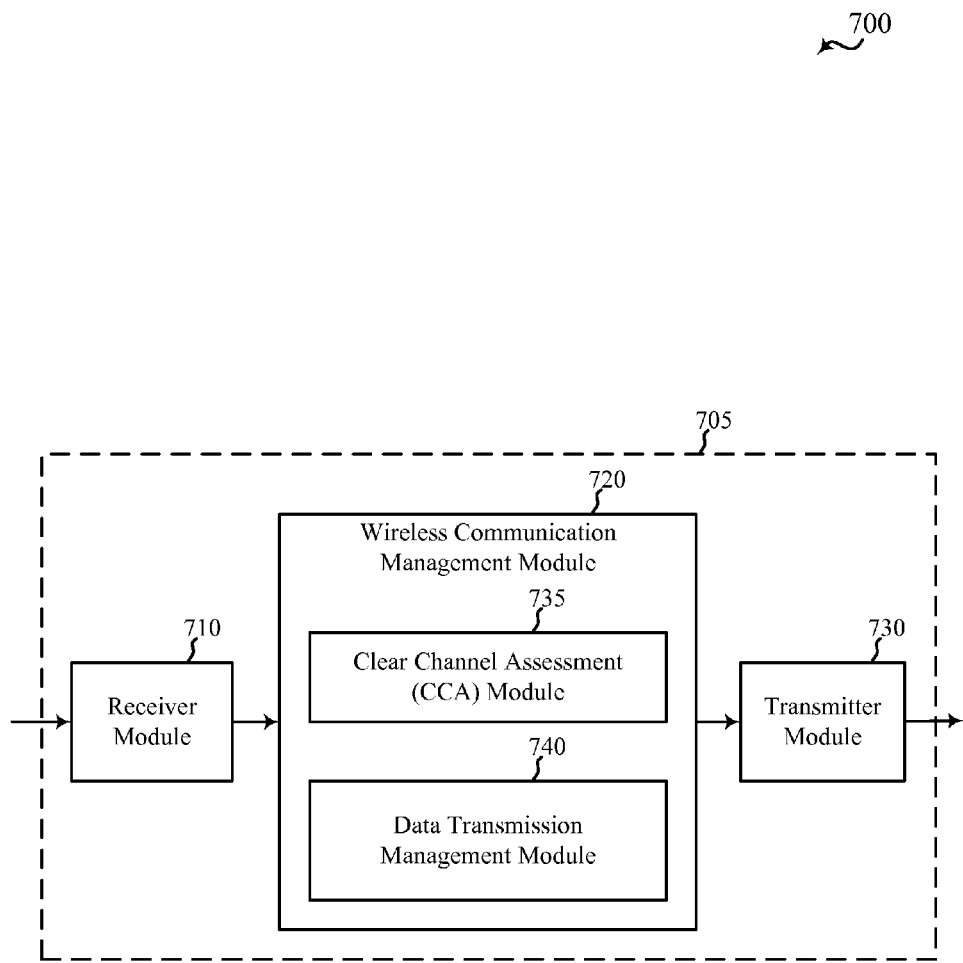
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. In some examples, the apparatus 705 may be an example of aspects of one or more of the base stations 105, 205, 205-a, 305, and/or 305-a described with reference to FIG. 1, 2, and/or 3. In some examples, the apparatus 705 may be part of a first node associated with a first operator in a deployment of operators over an unlicensed radio frequency spectrum band. The apparatus 705 and/or first node may in some examples be, or be part of, an LTE/LTE-A eNB and/or an LTE/LTE-A base station. The apparatus 705 may also be a processor. The apparatus 705 may include a receiver module 710, a wireless communication management module 720, and/or a transmitter module 730. Each of these components may be in communication with each other.

The components of the apparatus 705 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 710 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIG. 1, 2, 3, 4, 5, and/or 6. The receiver module 710 may be used to receive various types of data and/or control signals (i.e., transmissions) over one or more communication links of a wireless communication system, such as one or more communication links of the wireless communication system 100, 200, and/or 300 described with reference to FIG. 1, 2, and/or 3. The communication links may be established over the licensed radio frequency spectrum band and/or the unlicensed radio frequency spectrum band.

In some examples, the transmitter module 730 may include at least one RF transmitter, such as at least one RF transmitter operable to transmit over the licensed radio frequency spectrum band and/or the unlicensed radio frequency spectrum band. The transmitter module 730 may be used to transmit various types of data and/or control signals (i.e., transmissions) over one or more communication links of a wireless communication system, such as one or more communication links of the wireless communication system 100, 200, and/or 300 described with reference to FIG. 1, 2, and/or 3. The communication links may be established over the licensed radio frequency spectrum band and/or the unlicensed radio frequency spectrum band.

In some examples, the wireless communication management module 720 may be used to manage one or more aspects of wireless communication for the apparatus 705. In some examples, the wireless communication management module 720 may include a CCA module 735 and/or a data transmission management module 740. Each of these components may be in communication with each other.

In some examples, the CCA module 735 may be used to perform CCAs for the apparatus 705. Each CCA may be performed for a corresponding frame of the unlicensed radio frequency spectrum band, to contend for access to the frame of the unlicensed radio frequency spectrum band.

In some examples, the data transmission management module 740 may be used, when a CCA performed by the CCA module 735 is successful, to transmit data over the unlicensed radio frequency spectrum band. The data may in some cases be transmitted in accordance with an agreement between the first operator and a second operator in the deployment of operators. In some examples, the first operator and the second operator may be or include different PLMNs. In some examples, the transmission of the data subject to the agreement may be part of at least one of an MBMS transmission and/or a CoMP transmission by the first node and the second node.

In some examples, the agreement between the first operator and the second operator may include a predefined agreement and/or an opportunistic agreement. A predefined agreement may specify, in some examples, that the first operator (and/or one or more nodes of the first operator including the first node) will attempt to transmit the data subject to the agreement when a node of the first operator (e.g., the first node) gains access to the unlicensed radio frequency spectrum band and is able to transmit the data subject to the agreement (e.g., when the first node gains access to the unlicensed radio frequency spectrum band during an MBSFN frame). An opportunistic agreement may indicate, in some examples, that the first operator (and/or one or more nodes of the first operator including the first node) will attempt to opportunistically transmit the data to assist the second operator. An opportunistic agreement may in some cases be based on a transmission status (or statuses) of one or more nodes (e.g., a second node) of the second operator. For example, an opportunistic agreement may specify that a node of the first operator (e.g., the first node) will attempt to transmit the data subject to the agreement 1) when the node of the first operator gains access to the unlicensed radio frequency spectrum band and is able to transmit the data subject to the agreement (e.g., when the first node gains access to the unlicensed radio frequency spectrum band during an MBSFN frame), and 2) during a frame for which the node of the first operator has detected that a node of the second operator (e.g., the second node) has transmitted, is transmitting, or will be transmitting the data subject to the agreement. As another example, an opportunistic agreement may specify that a node of the first operator (e.g., the first node) will attempt to transmit the data subject to the agreement 1) when the node of the first operator gains access to the unlicensed radio frequency spectrum band and is able to transmit the data subject to the agreement (e.g., when the first node gains access to the unlicensed radio frequency spectrum band during an MBSFN frame), and 2) during a frame for which the node of the first operator has detected that a node of the second operator (e.g., the second node) has not transmitted, is not transmitting, and will not be transmitting the data.

Figure 8:
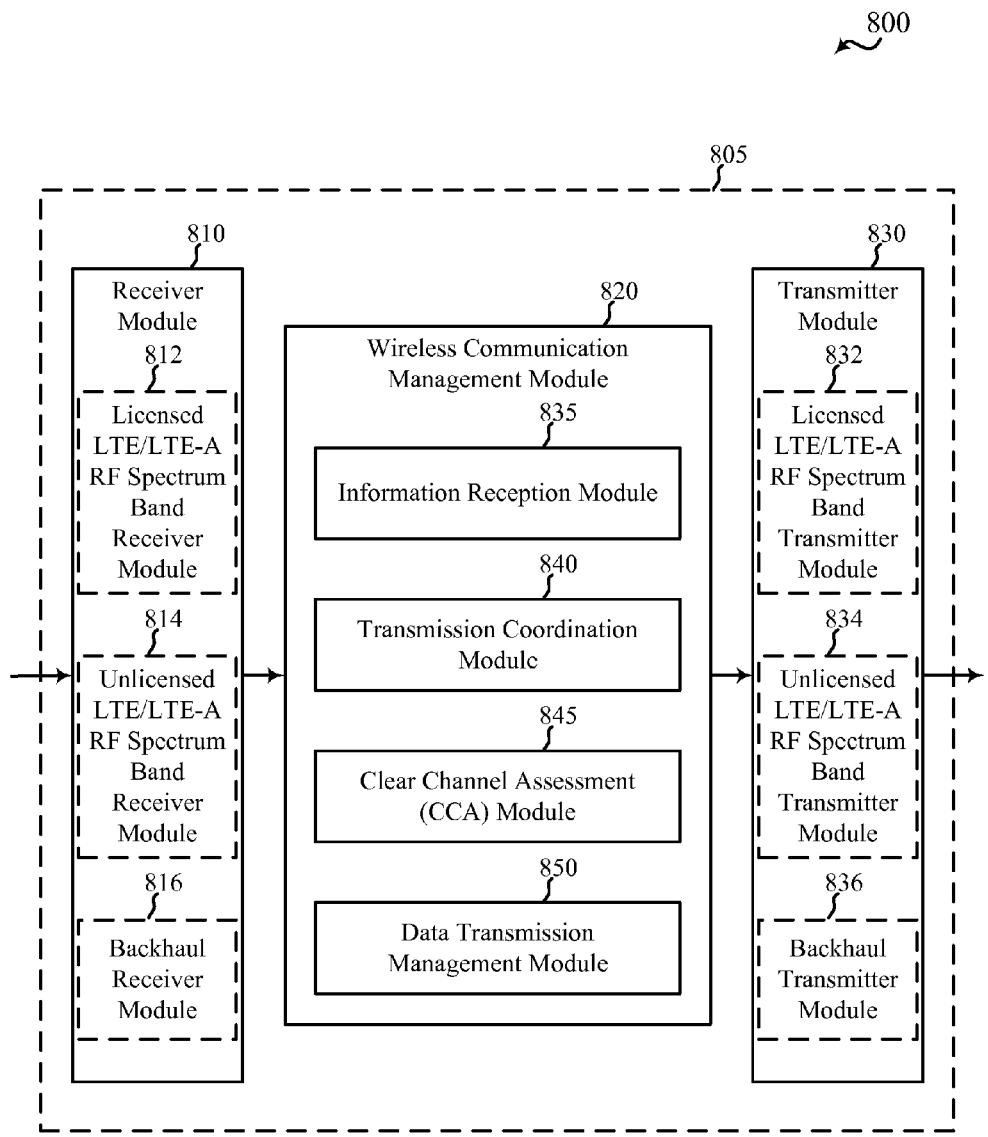
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. In some examples, the apparatus 805 may be an example of aspects of one or more of the base stations 105, 205, 205-*a*, 305, and/or 305-*a* described with reference to FIG. 1, 2, and/or 3, and/or an example of aspects of the apparatus 705 described with reference to FIG. 7. In some examples, the apparatus 805 may be part of a first node associated with a first operator in a deployment of operators over an unlicensed radio frequency spectrum band. The apparatus 805 and/or first node may in some examples be, or be part of, an LTE/LTE-A eNB and/or an LTE/LTE-A base station. The apparatus 805 may also be a processor. The apparatus 805 may include a receiver module 810, a wireless communication management module 820, and/or a transmitter module 830. Each of these components may be in communication with each other.

The components of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 810 may be an example of one or more aspects of the receiver module 710 described with reference to FIG. 7. In some examples, the receiver module 810 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIG. 1, 2, 3, 4, 5, 6, and/or 7. The receiver module 810 may in some cases include separate receivers for the licensed radio frequency spectrum band and the unlicensed radio frequency spectrum band. The separate receivers may, in some examples, take the form of a licensed LTE/LTE-A RF spectrum band receiver module 812 for communicating over the licensed radio frequency spectrum band, and an unlicensed LTE/LTE-A RF spectrum band receiver module 814 for communicating over the unlicensed radio frequency spectrum band. In some examples, the receiver module 810 may also include a backhaul receiver module 816. The receiver module 810, including the licensed LTE/LTE-A RF spectrum band receiver module 812, the unlicensed LTE/LTE-A RF spectrum band receiver module 814, and/or the backhaul receiver module 816 may be used to receive various types of data and/or control signals (i.e., transmissions) over one or more communication links and/or backhaul links of a wireless communication system, such as one or more communication links and/or backhaul links of the wireless communication system 100, 200, and/or 300 described with reference to FIG. 1, 2, and/or 3. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the transmitter module 830 may be an example of one or more aspects of the transmitter module 730 described with reference to FIG. 7. In some examples, the transmitter module 830 may include at least one RF transmitter, such as at least one RF transmitter operable to transmit over the licensed radio frequency spectrum band and/or the unlicensed radio frequency spectrum band. The transmitter module 830 may in some cases include separate transmitters for the licensed radio frequency spectrum band and the unlicensed radio frequency spectrum band. The separate transmitters may, in some examples, take the form of a licensed LTE/LTE-A RF spectrum band transmitter module 832 for communicating over the licensed radio frequency spectrum band, and an unlicensed LTE/LTE-A RF spectrum band transmitter module 834 for communicating over the unlicensed radio frequency spectrum band. In some examples, the transmitter module 830 may also include a backhaul transmitter module 836. The transmitter module 830, including the licensed LTE/LTE-A RF spectrum band transmitter module 832, the unlicensed LTE/LTE-A RF spectrum band transmitter module 834, and/or the backhaul transmitter module 836 may be used to transmit various types of data and/or control signals (i.e., transmissions) over one or more communication links and/or backhaul links of a wireless communication system, such as one or more communication links and/or backhaul links of the wireless communication system 100, 200, and/or 300 described with reference to FIG. 1, 2, and/or 3. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the wireless communication management module 820 may be an example of one or more aspects of the wireless communication management module 720 described with reference to FIG. 7. The wireless communication management module 820 may include an information reception module 835, a transmission coordination module 840, a CCA module 845, and/or a data transmission management module 850. Each of these components may be in communication with each other.

In some examples, the information reception module 835 may be used to receive information about a transmission of data over an unlicensed radio frequency band, which data is to be transmitted in accordance with an agreement between the first operator and a second operator in the deployment of operators over the unlicensed radio frequency spectrum band. In some examples, the first operator and the second operator may be or include different PLMNs.

In some examples, the agreement between the first operator and the second operator may include a predefined agreement. The predefined agreement may specify, for example, that the first operator (and/or one or more nodes of the first operator including the first node) will attempt to transmit the data subject to the agreement when a node of the first operator (e.g., the first node) gains access to the unlicensed radio frequency spectrum band and is able to transmit the data subject to the agreement (e.g., when the first node gains access to the unlicensed radio frequency spectrum band during an MBSFN frame). In the above description, and elsewhere in the description of FIG. 8, the second node may be a neighbor node of the node including the apparatus 805. In some examples, at least one of the node including the apparatus 805 or the second node may be or include an LTE/LTE-A eNB and/or an LTE/LTE-A base station.

In some examples, the information about the transmission of the data may be received (e.g., by the information reception module 835) from at least one of an OAM server, a multicast coordination entity of the first operator communicatively coupled with the second operator, a second node associated with the second operator, a third node associated with the first operator, a service information bulletin transmitted by the second node, or a multicast channel transmitted by the second node. In some examples, the information about the transmission of the data may include at least one of the data which is to be transmitted subject to the agreement, or configuration data for the transmission of the data.

In some examples, the transmission coordination module 840 may be used to coordinate the transmission of the data between the node including the apparatus 805 and the second node. In some examples, the coordination may include determining an MCCH configuration to use to transmit the data, which MCCH configuration is common to the node including the apparatus 805 and the second node. In some examples, the coordination may also or alternately include determining a SYNC PDU to use to transmit the data, which SYNC PDU is common to the node including the apparatus 805 and the second node. In some examples, the MCCH configuration and/or the SYNC PDU may be determined based on signaling received via a core network (e.g., via a core network such as the core network 130 described with reference to FIG. 1) and/or via the second node.

The coordination by the transmission coordination module 840 may also or alternately include determining, by the first node, a location for performing a CCA (e.g., one of the DCCA opportunities for performing the DCCA 540 described with reference to FIG. 5) for a frame of the unlicensed radio frequency spectrum band. In some examples, the location for performing the CCA may be aligned with a location of a CCA determined by the second node (e.g., the location for performing the CCA may be the same for the first node and the second node) and/or a location of a CCA determined by a core network (e.g., a core network such as the core network 130 and/or 1245). In other examples, the transmission coordination module 840 may independently or semi-independently determine a location for performing a CCA, based on a mapping function such as the mapping function described with reference to FIG. 4. In some examples, the transmission coordination module 840 may use different methods and/or functions to determine a location for performing a CCA for a frame of the unlicensed radio frequency spectrum band in which data subject to the agreement is to be transmitted (e.g., an MBSFN frame) versus a frame of the unlicensed radio frequency spectrum band in which other data is to be transmitted.

In some examples, the CCA module 845 may be an example of one or more aspects of the CCA module 735 described with reference to FIG. 7. In some examples, the CCA module 845 may be used to perform CCAs for the apparatus 805. Each CCA may be performed for a corresponding frame of the unlicensed radio frequency spectrum band, to contend for access to the frame of the unlicensed radio frequency spectrum band.

In some examples, the data transmission management module 850 may be an example of one or more aspects of the data transmission management module 740 described with reference to FIG. 7. In some examples, the data transmission management module 850 may be used to manage the transmission of data by the apparatus 805. In some examples, transmitted data may include the data subject to the agreement between the first operator and the second operator.

When the data transmission management module 850 determines that a CCA performed for a frame of the unlicensed radio frequency spectrum band fails, the data transmission management module 850 may forego a transmission of data during the frame.

When the data transmission management module 850 determines that a CCA performed for a frame of the unlicensed radio frequency spectrum band is successful, but the frame is not a frame for transmitting data subject to the agreement, the data transmission management module 850 may forego a transmission of the data subject to the agreement during the frame. However, the data transmission management module 850 may manage the transmission of other data over the unlicensed radio frequency spectrum band (e.g., data not subject to the agreement between the first operator and the second operator).

When the data transmission management module 850 determines that a CCA performed for a frame of the unlicensed radio frequency spectrum band is successful, and that the frame is a frame for transmitting data subject to the agreement, the data transmission management module 850 may cause the data subject to the agreement to be transmitted over the unlicensed radio frequency spectrum band. Otherwise, the data transmission management module 850 may forego a transmission of the data subject to the agreement during the frame.

Figure 9:
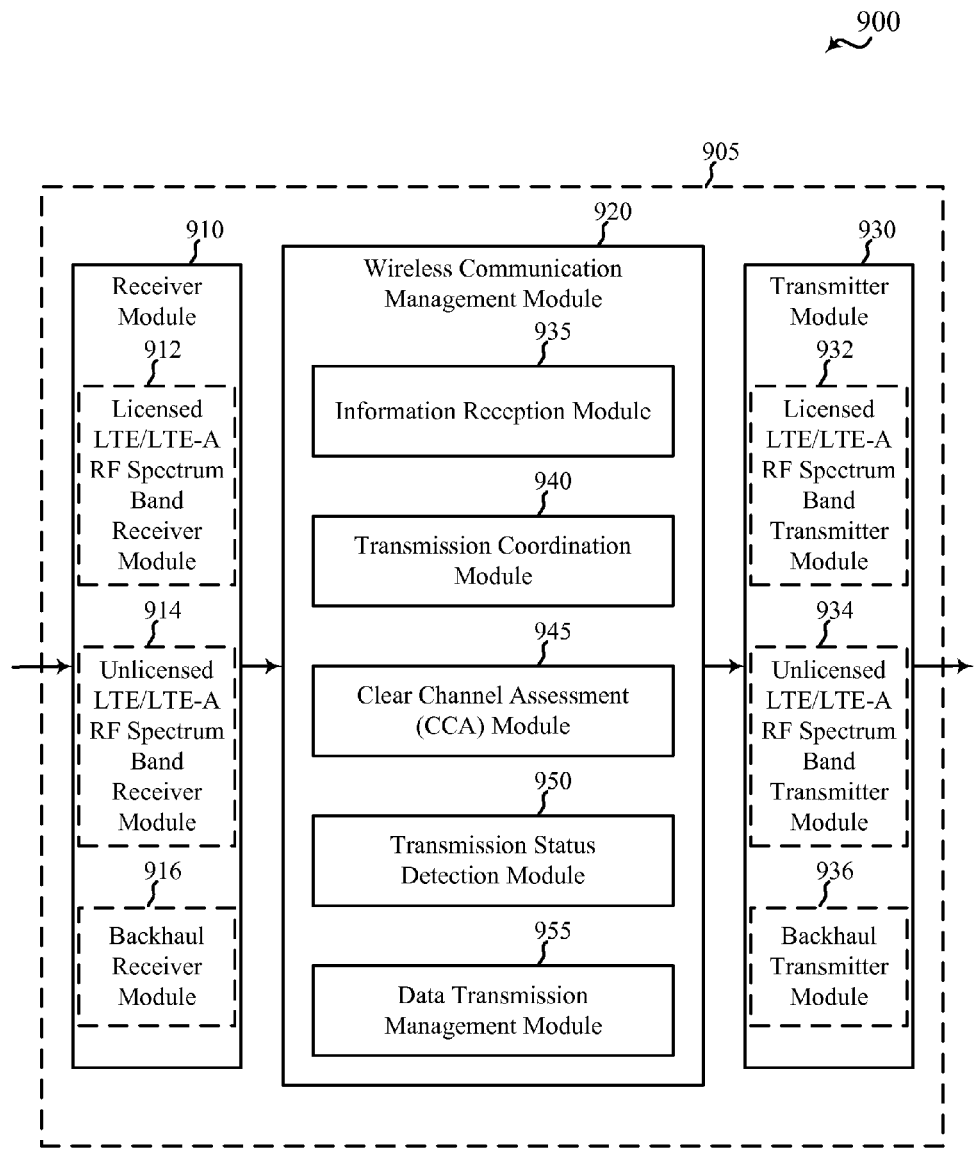
FIG. 9 shows a block diagram of an apparatus for use in wireless communication, in accordance with various aspects of the present disclosure.

FIG. 9 shows a block diagram 900 of an apparatus 905 for use in wireless communication, in accordance with various aspects of the present disclosure. In some examples, the apparatus 905 may be an example of aspects of one or more of the base stations 105, 205, 205-*a*, 305, and/or 305-*a* described with reference to FIG. 1, 2, and/or 3, and/or an example of aspects of the apparatus 705 described with reference to FIG. 7. In some examples, the apparatus 905 may be part of a first node associated with a first operator in a deployment of operators over an unlicensed radio frequency spectrum band. The apparatus 905 and/or first node may in some examples be, or be part of, an LTE/LTE-A eNB and/or an LTE/LTE-A base station. The apparatus 905 may also be a processor. The apparatus 905 may include a receiver module 910, a wireless communication management module 920, and/or a transmitter module 930. Each of these components may be in communication with each other.

The components of the apparatus 905 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 910 may be an example of one or more aspects of the receiver module 710 described with reference to FIG. 7. In some examples, the receiver module 910 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIG. 1, 2, 3, 4, 5, 6, and/or 7. The receiver module 910 may in some cases include separate receivers for the licensed radio frequency spectrum band and the unlicensed radio frequency spectrum band. The separate receivers may, in some examples, take the form of a licensed LTE/LTE-A RF spectrum band receiver module 912 for communicating over the licensed radio frequency spectrum band, and an unlicensed LTE/LTE-A RF spectrum band receiver module 914 for communicating over the unlicensed radio frequency spectrum band. In some examples, the receiver module 910 may also include a backhaul receiver module 916. The receiver module 910, including the licensed LTE/LTE-A RF spectrum band receiver module 912, the unlicensed LTE/LTE-A RF spectrum band receiver module 914, and/or the backhaul receiver module 916 may be used to receive various types of data and/or control signals (i.e., transmissions) over one or more communication links and/or backhaul links of a wireless communication system, such as one or more communication links and/or backhaul links of the wireless communication system 100, 200, and/or 300 described with reference to FIG. 1, 2, and/or 3. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the transmitter module 930 may be an example of one or more aspects of the transmitter module 730 described with reference to FIG. 7. In some examples, the transmitter module 930 may include at least one RF transmitter, such as at least one RF transmitter operable to transmit over the licensed radio frequency spectrum band and/or the unlicensed radio frequency spectrum band. The transmitter module 930 may in some cases include separate transmitters for the licensed radio frequency spectrum band and the unlicensed radio frequency spectrum band. The separate transmitters may, in some examples, take the form of a licensed LTE/LTE-A RF spectrum band transmitter module 932 for communicating over the licensed radio frequency spectrum band, and an unlicensed LTE/LTE-A RF spectrum band transmitter module 934 for communicating over the unlicensed radio frequency spectrum band. In some examples, the transmitter module 930 may also include a backhaul transmitter module 936. The transmitter module 930, including the licensed LTE/LTE-A RF spectrum band transmitter module 932, the unlicensed LTE/LTE-A RF spectrum band transmitter module 934, and/or the backhaul transmitter module 936 may be used to transmit various types of data and/or control signals (i.e., transmissions) over one or more communication links and/or backhaul links of a wireless communication system, such as one or more communication links and/or backhaul links of the wireless communication system 100, 200, and/or 300 described with reference to FIG. 1, 2, and/or 3. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the wireless communication management module 920 may be an example of one or more aspects of the wireless communication management module 720 described with reference to FIG. 7. The wireless communication management module 920 may include an information reception module 935, a transmission coordination module 940, a CCA module 945, a transmission status detection module 950, and/or a data transmission management module 955. Each of these components may be in communication with each other.

In some examples, the information reception module 935 may be used to receive information about a transmission of data over an unlicensed radio frequency band, which data is to be transmitted in accordance with an agreement between the first operator and a second operator in the deployment of operators over the unlicensed radio frequency spectrum band. In some examples, the first operator and the second operator may be or include different PLMNs.

In some examples, the agreement between the first operator and the second operator may include an opportunistic agreement. The opportunistic agreement may specify, for example, that the first operator (and/or one or more nodes of the first operator including the first node) will attempt to opportunistically transmit data to assist the second operator. An opportunistic agreement may in some cases be based on a transmission status (or statuses) of one or more nodes of the second operator (e.g., one or more nodes including a second node of the second operator). For example, an opportunistic agreement may specify that a node of the first operator (e.g., a node including the apparatus 905) will attempt to transmit the data subject to the agreement 1) when the node of the node of the first operator gains access to the unlicensed radio frequency spectrum band and is able to transmit the data subject to the agreement (e.g., when the apparatus 905 gains access to the unlicensed radio frequency spectrum band during an MBSFN frame), and 2) during a frame for which the node of the first operator detects that a node of the second operator (e.g., the second node) has transmitted, is transmitting, or will be transmitting the data. In the above description and elsewhere in the description of FIG. 9, the second node may be considered a primary node (i.e., a node from which the data subject to the agreement is intended to be transmitted), and the first node (e.g., the node including the apparatus 905) may be considered a secondary node (i.e., a node from which the data intended to be transmitted from the second node is transmitted to assist the second operator with data transmissions). Also in the above description, and elsewhere in the description of FIG. 9, the second node may be a neighbor node of the node including the apparatus 905. In some examples, at least one of the node including the apparatus 905 or the second node may be or include an LTE/LTE-A eNB and/or an LTE/LTE-A base station.

As another example, an opportunistic agreement between the first operator and the second operator may specify, for example, that a node of the first operator (e.g., a node including the apparatus 905) will attempt to transmit the data subject to the agreement 1) when the node of the node of the first operator gains access to the unlicensed radio frequency spectrum band and is able to transmit the data subject to the agreement (e.g., when the apparatus 905 gains access to the unlicensed radio frequency spectrum band during an MBSFN frame), and 2) during a frame for which the node of the first operator detects that a node of the second operator (e.g., the second node) has not transmitted, is not transmitting, and will not be transmitting the data.

In some examples, the information about the transmission of the data may be received (e.g., by the information reception module 935) from at least one of an OAM server, a multicast coordination entity of the first operator communicatively coupled with the second operator, a second node associated with the second operator, a third node associated with the first operator, a service information bulletin transmitted by the second node, or a multicast channel transmitted by the second node. In some examples, the information about the transmission of the data may include at least one of the data which is to be transmitted subject to the agreement, or configuration data for the transmission of the data.

In some examples, the transmission coordination module 940 may be used to coordinate the transmission of the data between the node including the apparatus 905 and the second node. In some examples, the coordination may include determining an MCCH configuration to use to transmit the data, which MCCH configuration is common to the node including the apparatus 905 and the second node. In some examples, the coordination may also or alternately include determining a SYNC PDU to use to transmit the data, which SYNC PDU is common to the node including the apparatus 905 and the second node. In some examples, the MCCH configuration and/or the SYNC PDU may be determined based on signaling received via a core network (e.g., via a core network such as the core network 130 described with reference to FIG. 1) and/or via the second node.

The coordination by the transmission coordination module 940 may also or alternately include determining, by the first node, a location for performing a CCA (e.g., one of the DCCA opportunities for performing the DCCA 540 described with reference to FIG. 5) for a frame of the unlicensed radio frequency spectrum band. In some examples, the location for performing the CCA may be aligned with a location of a CCA determined by the second node (e.g., the location for performing the CCA may be the same for the first node and the second node) and/or a location of a CCA determined by a core network (e.g., a core network such as the core network 130 and/or 1245). In other examples, the transmission coordination module 940 may independently or semi-independently determine a location for performing a CCA, based on a mapping function such as the mapping function described with reference to FIG. 4. In some examples, the transmission coordination module 940 may use different methods and/or functions to determine a location for performing a CCA for a frame of the unlicensed radio frequency spectrum band in which data subject to the agreement is to be transmitted (e.g., an MBSFN frame) versus a frame of the unlicensed radio frequency spectrum band in which other data is to be transmitted.

In some examples, the CCA module 945 may be an example of one or more aspects of the CCA module 735 described with reference to FIG. 7. In some examples, the CCA module 945 may be used to perform CCAs for the apparatus 905. Each CCA may be performed for a corresponding frame of the unlicensed radio frequency spectrum band, to contend for access to the frame of the unlicensed radio frequency spectrum band.

In some examples, the transmission status detection module 950 may be used to determine, for a frame of the unlicensed radio frequency spectrum band, a transmission status of the second node. The transmission status may include one of a first transmission status in which the second node has transmitted, is transmitting, or will be transmitting the data subject to the agreement during the frame; and a second transmission status in which the second node has not transmitted, is not transmitting, and will not be transmitting the data subject to the agreement during the frame.

In some examples, the transmission status of the second node, for a frame of the unlicensed radio frequency spectrum band, may be detected based on a blind detection of a CUBS transmitted by the second node. For example, when the transmission status detection module 950 detects a CUBS of the second node corresponding to the frame, the transmission status detection module 950 may assume that a CCA of the second node corresponding to the frame succeeded, and that the second node will transmit the data subject to the agreement. However, when the transmission status detection module 950 does not detect a CUBS of the second node corresponding to the frame, the transmission status detection module 950 may assume that a CCA of the second node corresponding to the frame failed, and that the second node will not be transmitting the data subject to the agreement.

In some examples, the data transmission management module 955 may be an example of one or more aspects of the data transmission management module 740 described with reference to FIG. 7. In some examples, the data transmission management module 955 may be used to manage the transmission of data by the apparatus 905. In some examples, transmitted data may include the data subject to the agreement between the first operator and the second operator.

When the data transmission management module 955 determines that a CCA performed for a frame of the unlicensed radio frequency spectrum band fails, the data transmission management module 955 may forego a transmission of data during the frame.

When the data transmission management module 955 determines that a CCA performed for a frame of the unlicensed radio frequency spectrum band is successful, but the frame is not a frame for transmitting data subject to the agreement, the data transmission management module 955 may forego a transmission of the data subject to the agreement during the frame. However, the data transmission management module 955 may manage the transmission of other data over the unlicensed radio frequency spectrum band (e.g., data not subject to the agreement between the first operator and the second operator). When the other data may be transmitted concurrently with data transmitted by the second node, the other data may be transmitted at a lower power to avoid interference with a transmission of the data subject to the agreement by the second node. In some examples, the power at which the other data is transmitted may be set based on a detected signal power of the second node (e.g., a signal power at which a CUBS of the second node is transmitted).

When the data transmission management module 955 determines that a CCA performed for a frame of the unlicensed radio frequency spectrum band is successful, and that the frame is a frame for transmitting data subject to the agreement, the data transmission management module 955 may transmit (or not transmit) data based on the detected transmission status of the second node. For example, when 1) the agreement between the first operator and the second operator specifies that the apparatus 905 will assist the second operator by transmitting data subject to the agreement during a frame for which the apparatus 905 detects that the second node has transmitted, is transmitting, or will be transmitting the data, and when 2) the transmission status detection module 950 detects that the transmission status of the second node for the frame is the first transmission status (i.e., that the second node has transmitted, is transmitting, or will be transmitting the data), the data transmission management module 955 may cause the data subject to the agreement to be transmitted over the unlicensed radio frequency spectrum band. Otherwise, the data transmission management module 955 may forego a transmission of the data subject to the agreement during the frame. Similarly, when 1) the agreement between the first operator and the second operator specifies that the apparatus 905 will assist the second operator by transmitting data subject to the agreement during a frame for which the apparatus 905 detects that a node of the second operator (e.g., the second node) has not transmitted, is not transmitting, and will not be transmitting the data, and when 2) the transmission status detection module 950 detects that the transmission status of the second node for the frame is the second transmission status (i.e., that the second node has not transmitted, is not transmitting, or will not be transmitting the data), the data transmission management module 955 may cause data subject to the agreement to be transmitted over the unlicensed radio frequency spectrum band. Otherwise, the data transmission management module 955 may forego a transmission of the data subject to the agreement during the frame.

Figure 10:
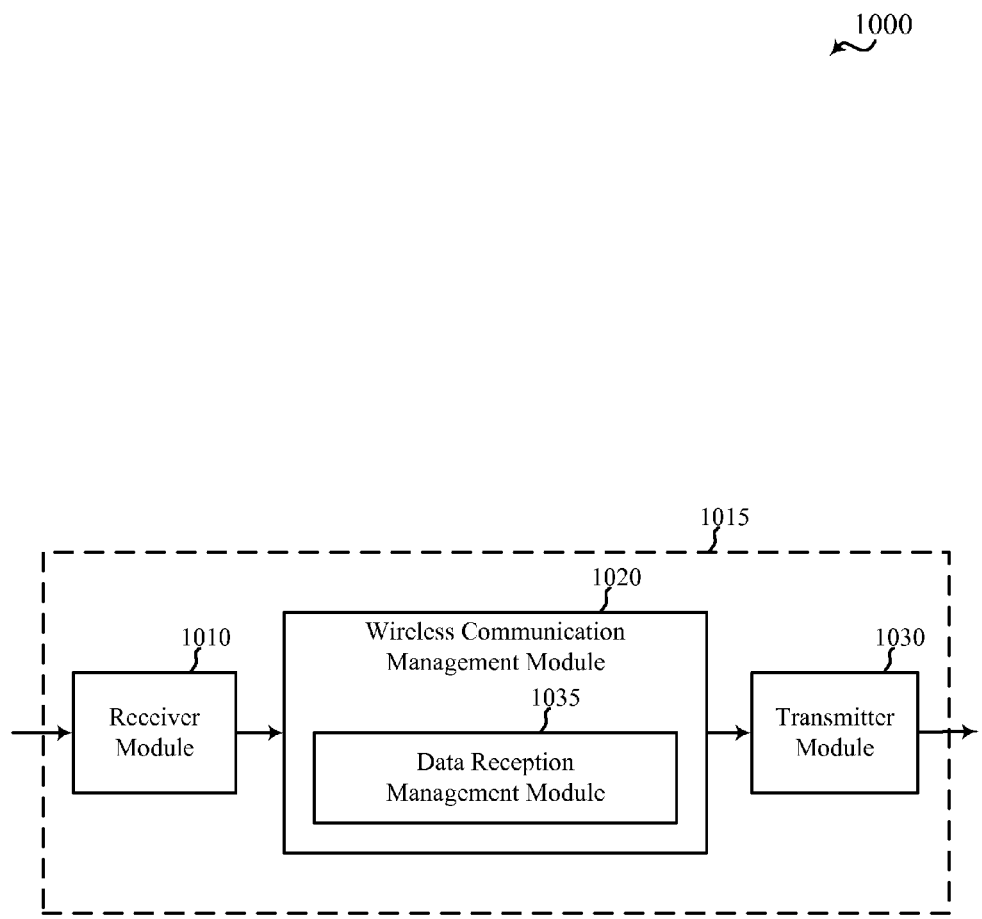
FIG. 10 shows a block diagram of an apparatus for use in wireless communication, in accordance with various aspects of the present disclosure.

FIG. 10 shows a block diagram 1000 of an apparatus 1015 for use in wireless communication, in accordance with various aspects of the present disclosure. In some examples, the apparatus 1015 may be an example of aspects of one or more of the UEs 115, 215, 215-*a*, 215-*b*, 215-*c*, and/or 315 described with reference to FIG. 1, 2, and/or 3. The apparatus 1015 may also be a processor. The apparatus 1015 may include a receiver module 1010, a wireless communication management module 1020, and/or a transmitter module 1030. Each of these components may be in communication with each other.

The components of the apparatus 1015 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1010 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIG. 1, 2, 3, 4, 5, and/or 6. The receiver module 1010 may be used to receive various types of data and/or control signals (i.e., transmissions) over one or more communication links of a wireless communication system, such as one or more communication links of the wireless communication system 100, 200, and/or 300 described with reference to FIG. 1, 2, and/or 3. The communication links may be established over the licensed radio frequency spectrum band and/or the unlicensed radio frequency spectrum band.

In some examples, the transmitter module 1030 may include at least one RF transmitter, such as at least one RF transmitter operable to transmit over the licensed radio frequency spectrum band and/or the unlicensed radio frequency spectrum band. The transmitter module 1030 may be used to transmit various types of data and/or control signals (i.e., transmissions) over one or more communication links of a wireless communication system, such as one or more communication links of the wireless communication system 100, 200, and/or 300 described with reference to FIG. 1, 2, and/or 3. The communication links may be established over the licensed radio frequency spectrum band and/or the unlicensed radio frequency spectrum band.

In some examples, the wireless communication management module 1020 may be used to manage one or more aspects of wireless communication for the apparatus 1015. In some examples, the wireless communication management module 1020 may include a data reception management module 1035. The data reception management module 1035 may be used to receive, over an unlicensed radio frequency spectrum band, a first transmission from a first node associated with a first operator in a deployment of operators. The first transmission may include data originating from a second operator in the deployment of operators. In some examples, the first transmission may include data transmitted by the first node in accordance with an agreement between the first operator and a second operator in the deployment of operators. In some examples, the first operator and the second operator may be or include different PLMNs. The first node may in some examples be or include an LTE/LTE-A eNB and/or an LTE/LTE-A base station. In some examples, the first node may be an example of aspects of one or more of the base stations 105, 205, 205-*a*, 305, and/or 305-*a* described with reference to FIG. 1, 2, and/or 3, and/or an example of aspects of one or more of the apparatuses 705, 805, and/or 905 described with reference to FIG. 7, 8, and/or 9.

In some examples, the apparatus 1015 may be connected to a second node associated with the second operator. The second node may in some examples be or include a second LTE/LTE-A eNB and/or a second LTE/LTE-A base station.

Figure 11:
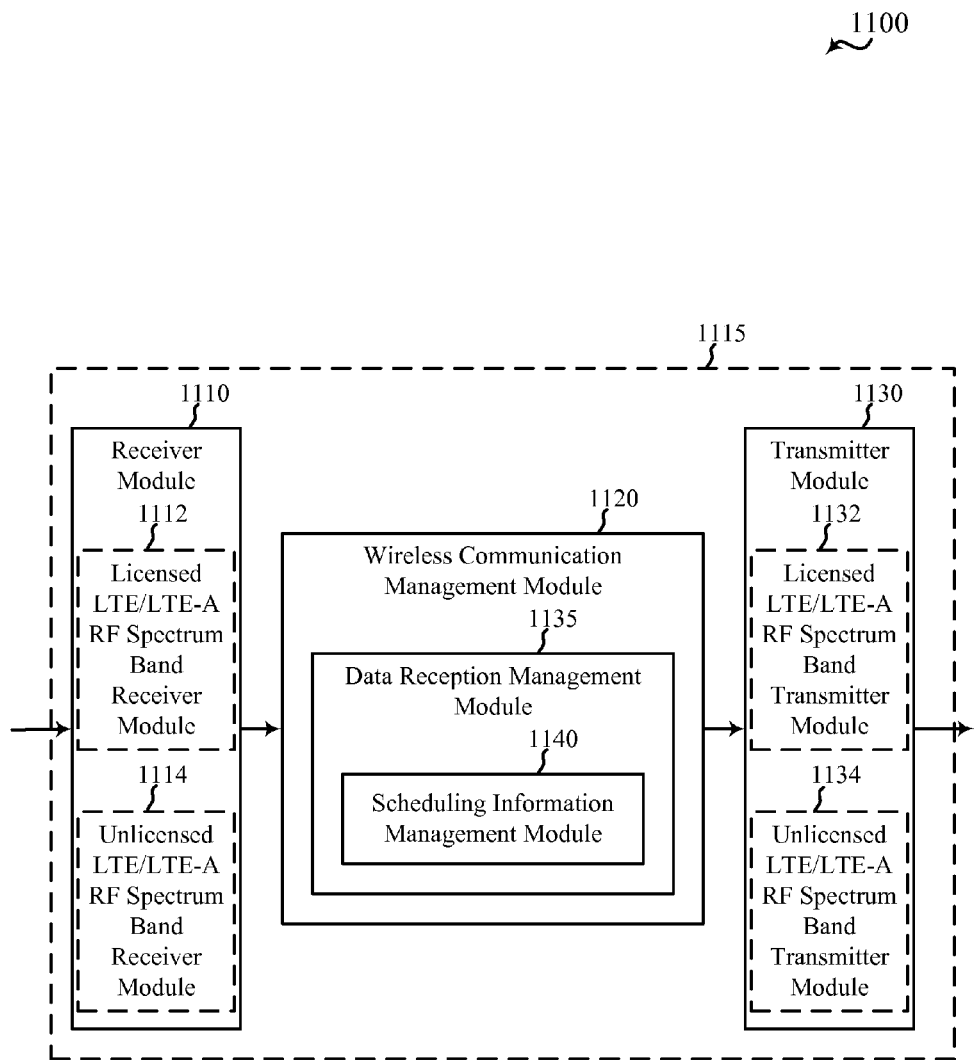
FIG. 11 shows a block diagram of an apparatus for use in wireless communication, in accordance with various aspects of the present disclosure.

FIG. 11 shows a block diagram 1100 of an apparatus 1115 for use in wireless communication, in accordance with various aspects of the present disclosure. In some examples, the apparatus 1115 may be an example of aspects of one or more of the UEs 115, 215, 215-*a*, 215-*b*, 215-*c*, and/or 315 described with reference to FIG. 1, 2, and/or 3, and/or an example of aspects of the apparatus 1015 described with reference to FIG. 10. The apparatus 1115 may also be a processor. The apparatus 1115 may include a receiver module 1110, a wireless communication management module 1120, and/or a transmitter module 1130. Each of these components may be in communication with each other.

The components of the apparatus 1115 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 1110 may be an example of one or more aspects of the receiver module 1010 described with reference to FIG. 10. In some examples, the receiver module 1110 may include at least one RF receiver, such as at least one RF receiver operable to receive transmissions over a licensed radio frequency spectrum band (e.g., a radio frequency spectrum band for which apparatuses do not contend for access because the radio frequency spectrum band is licensed to particular users (e.g., LTE/LTE-A users) for particular uses) and/or an unlicensed radio frequency spectrum band (e.g., a radio frequency spectrum band for which apparatuses may need to contend for access because the radio frequency spectrum band is available, at least in part, for unlicensed use (e.g., Wi-Fi use and/or unlicensed LTE/LTE-A use)). In some examples, the licensed radio frequency spectrum band and/or the unlicensed radio frequency spectrum band may be used for LTE/LTE-A communications, as described, for example, with reference to FIG. 1, 2, 3, 4, 5, 6, and/or 10. The receiver module 1110 may in some cases include separate receivers for the licensed radio frequency spectrum band and the unlicensed radio frequency spectrum band. The separate receivers may, in some examples, take the form of a licensed LTE/LTE-A RF spectrum band receiver module 1112 for communicating over the licensed radio frequency spectrum band, and an unlicensed LTE/LTE-A RF spectrum band receiver module 1114 for communicating over the unlicensed radio frequency spectrum band. The receiver module 1110, including the licensed LTE/LTE-A RF spectrum band receiver module 1112 and/or the unlicensed LTE/LTE-A RF spectrum band receiver module 1114, may be used to receive various types of data and/or control signals (i.e., transmissions) over one or more communication links and/or backhaul links of a wireless communication system, such as one or more communication links and/or backhaul links of the wireless communication system 100, 200, and/or 300 described with reference to FIG. 1, 2, and/or 3. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the transmitter module 1130 may be an example of one or more aspects of the transmitter module 1030 described with reference to FIG. 10. In some examples, the transmitter module 1130 may include at least one RF transmitter, such as at least one RF transmitter operable to transmit over the licensed radio frequency spectrum band and/or the unlicensed radio frequency spectrum band. The transmitter module 1130 may in some cases include separate transmitters for the licensed radio frequency spectrum band and the unlicensed radio frequency spectrum band. The separate transmitters may, in some examples, take the form of a licensed LTE/LTE-A RF spectrum band transmitter module 1132 for communicating over the licensed radio frequency spectrum band, and an unlicensed LTE/LTE-A RF spectrum band transmitter module 1134 for communicating over the unlicensed radio frequency spectrum band. The transmitter module 1130, including the licensed LTE/LTE-A RF spectrum band transmitter module 1132 and/or the unlicensed LTE/LTE-A RF spectrum band transmitter module 1134, may be used to transmit various types of data and/or control signals (i.e., transmissions) over one or more communication links and/or backhaul links of a wireless communication system, such as one or more communication links and/or backhaul links of the wireless communication system 100, 200, and/or 300 described with reference to FIG. 1, 2, and/or 3. The communication links and/or backhaul links may be established over the licensed radio frequency spectrum band and/or the unlicensed radio frequency spectrum band (and/or over one or more wired or wireless connections with, for example, a core network such as the core network 130 described with reference to FIG. 1).

In some examples, the wireless communication management module 1120 may be an example of one or more aspects of the wireless communication management module 1020 described with reference to FIG. 10. The wireless communication management module 1120 may include a data reception management module 1135.

In some examples, the data reception management module 1135 may be an example of aspects of the data reception management module 1035. In some examples, the data reception management module 1135 may include a scheduling information management module 1140.

In some examples, the scheduling information management module 1140 may receive scheduling information for a first transmission. The first transmission may be a transmission from a first node associated with a first operator in a deployment of operators, while the scheduling information may be received from a second node associated with a second operator. The scheduling information may be received prior to the first transmission. The scheduling information may, in some examples, be received over at least one of the licensed radio frequency spectrum band and/or the unlicensed radio frequency spectrum band. In some examples, the first operator and the second operator may be or include different PLMNs. The first node and/or the second node may, in some examples, be or include respective LTE/LTE-A eNBs and/or an LTE/LTE-A base stations. In some examples, the first node may be an example of aspects of one or more of the base stations 105, 205, 205-*a*, 305, and/or 305-*a* described with reference to FIG. 1, 2, and/or 3, and/or an example of aspects of one or more of the apparatuses 705, 805, and/or 905 described with reference to FIG. 7, 8, and/or 9.

In some examples, the data reception management module 1135 may be used to receive the first transmission from the first node. The first transmission may be received over the unlicensed radio frequency spectrum band. The first transmission may include data originating from the second operator (and in some examples, data originating from the second node). The first transmission may also include data transmitted by the first node in accordance with an agreement between the first operator and a second operator in the deployment of operators.

In some examples, the apparatus 1115 may be connected to a second node associated with the second operator. The second node may in some examples be or include a second LTE/LTE-A eNB and/or a second LTE/LTE-A base station. In these examples, the data reception management module 1135 may receive a second transmission from the second node over the unlicensed radio frequency spectrum band. The second transmission may include data originating from the second operator. In some examples, the first transmission and the second transmission may be received concurrently.

In some examples, at least one of the first transmission and/or the second transmission may be part of at least one of an MBMS transmission, a unicast transmission, and/or a CoMP transmission by the first node and the second node. In some examples, a first portion of the data originating from the second operator may be received from the first node during a first frame of the unlicensed radio frequency spectrum band, and a second portion of the data originating from the second operator may be received from the second node during a second frame of the unlicensed radio frequency spectrum band and/or the licensed radio frequency spectrum band. In some examples, the first frame may be received before the second frame. In other examples, the second frame may be received before the first frame. In other examples, the first frame and the second frame may be received concurrently.

Figure 12:
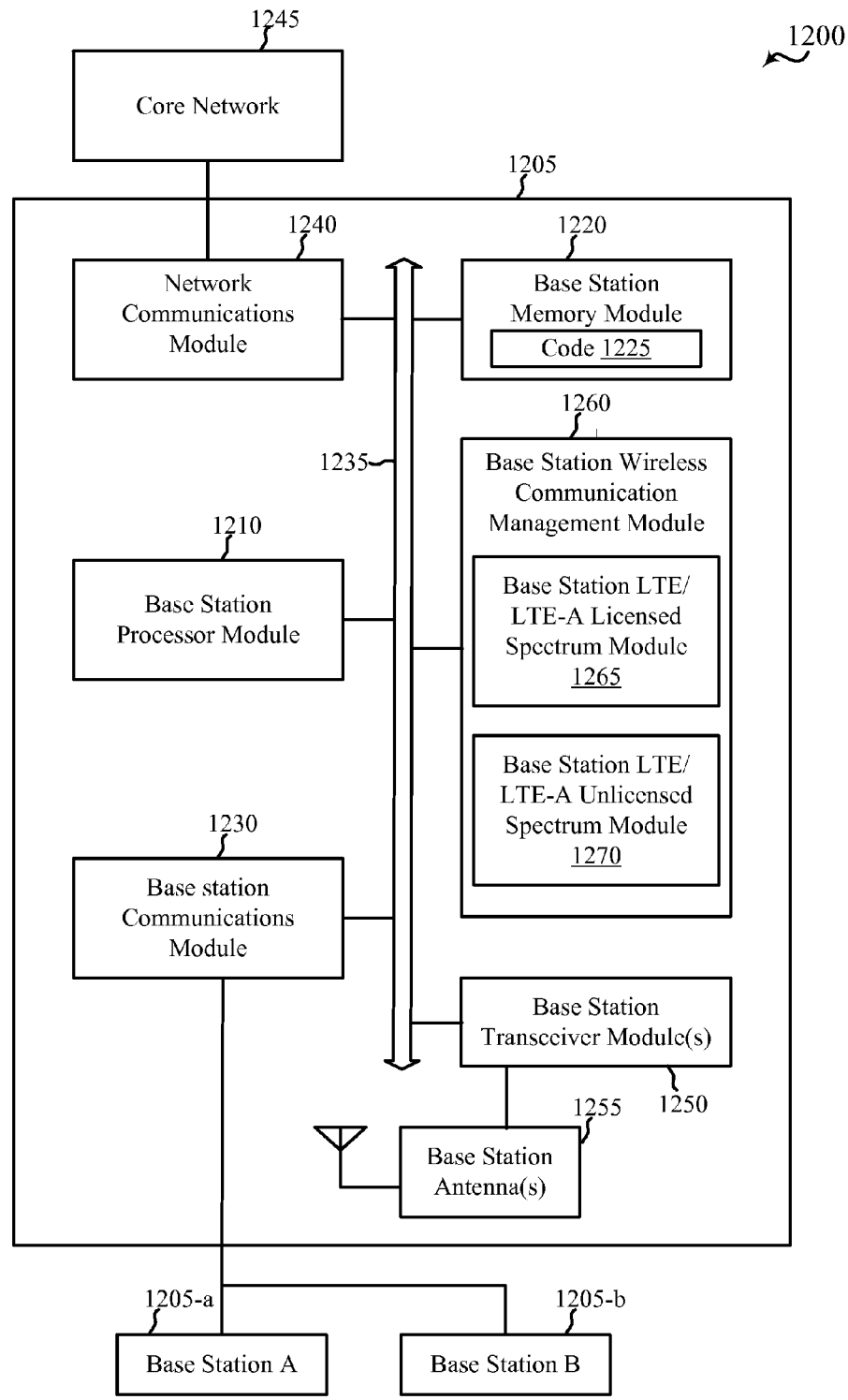
FIG. 12 shows a block diagram of a base station (e.g., a base station forming part or all of an evolved NodeB (eNB)) for use in wireless communication, in accordance with various aspects of the present disclosure.

FIG. 12 shows a block diagram 1200 of a base station 1205 (e.g., a base station forming part or all of an eNB) for use in wireless communication, in accordance with various aspects of the present disclosure. In some examples, the base station 1205 may be an example of aspects of one or more of the base stations 105, 205, 205-*a*, 305, and/or 305-*a* described with reference to FIG. 1, 2, and/or 3, and/or aspects of one or more of the apparatuses 705, 805, and/or 905 described with reference to FIG. 7, 8, and/or 9. The base station 1205 may be configured to implement or facilitate at least some of the base station and/or apparatus features and functions described with reference to FIG. 1, 2, 3, 4, 5, 6, 7, 8, and/or 9.

The base station 1205 may include a base station processor module 1210, a base station memory module 1220, at least one base station transceiver module (represented by base station transceiver module(s) 1250), at least one base station antenna (represented by base station antenna(s) 1255), and/or a base station wireless communication management module 1260. The base station 1205 may also include one or more of a base station communications module 1230 and/or a network communications module 1240. Each of these components may be in communication with each other, directly or indirectly, over one or more buses 1235.

The base station memory module 1220 may include random access memory (RAM) and/or read-only memory (ROM). The base station memory module 1220 may store computer-readable, computer-executable code 1225 containing instructions that are configured to, when executed, cause the base station processor module 1210 to perform various functions described herein related to wireless communication (e.g., functions relating to the transmission of data over an unlicensed radio frequency spectrum band in accordance with an agreement between operators, etc.). Alternatively, the code 1225 may not be directly executable by the base station processor module 1210 but be configured to cause the base station 1205 (e.g., when compiled and executed) to perform various of the functions described herein.

The base station processor module 1210 may include an intelligent hardware device, e.g., a central processing unit (CPU), a microcontroller, an ASIC, etc. The base station processor module 1210 may process information received through the base station transceiver module(s) 1250, the base station communications module 1230, and/or the network communications module 1240. The base station processor module 1210 may also process information to be sent to the transceiver module(s) 1250 for transmission through the antenna(s) 1255, to the base station communications module 1230, for transmission to one or more other base stations 1205-*a* and 1205-*b*, and/or to the network communications module 1240 for transmission to a core network 1245, which may be an example of one or more aspects of the core network 130 described with reference to FIG. 1. The base station processor module 1210 may handle, alone or in connection with the base station wireless communication management module 1260, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., a radio frequency spectrum band for which apparatuses may need to contend for access because the radio frequency spectrum band is available, at least in part, for unlicensed use, such as Wi-Fi use and/or unlicensed LTE/LTE-A use).

The base station transceiver module(s) 1250 may include a modem configured to modulate packets and provide the modulated packets to the base station antenna(s) 1255 for transmission, and to demodulate packets received from the base station antenna(s) 1255. The base station transceiver module(s) 1250 may, in some examples, be implemented as one or more base station transmitter modules and one or more separate base station receiver modules. The base station transceiver module(s) 1250 may support communications in the first radio frequency spectrum band and/or the second radio frequency spectrum band. The base station transceiver module(s) 1250 may be configured to communicate bi-directionally, via the antenna(s) 1255, with one or more UEs or apparatuses, such as one or more of the UEs 115, 215, 215-*a*, 215-*b*, 215-*c*, and/or 315 described with reference to FIG. 1, 2, and/or 3, and/or one or more of the apparatuses 705, 805, and/or 905 described with reference to FIG. 7, 8, and/or 9. The base station 1205 may, for example, include multiple base station antennas 1255 (e.g., an antenna array). The base station 1205 may communicate with the core network 1245 through the network communications module 1240. The base station 1205 may also communicate with other base stations, such as the base stations 1205-*a* and 1205-*b*, using the base station communications module 1230.

The base station wireless communication management module 1260 may be configured to perform and/or control some or all of the features and/or functions described with reference to FIG. 1, 2, 3, 4, 5, 6, 7, 8, and/or 9 related to wireless communication over the first radio frequency spectrum band and/or the second radio frequency spectrum band (e.g., functions relating to the transmission of data over the second (or unlicensed) radio frequency spectrum band in accordance with an agreement between operators, etc.). For example, the base station wireless communication management module 1260 may be configured to support a supplemental downlink mode, a carrier aggregation mode, and/or a standalone mode using the first radio frequency spectrum band and/or the second radio frequency spectrum band. The base station wireless communication management module 1260 may include a base station LTE/LTE-A licensed spectrum module 1265 configured to handle LTE/LTE-A communications in the first radio frequency spectrum band, and a base station LTE/LTE-A unlicensed spectrum module 1270 configured to handle LTE/LTE-A communications in the second radio frequency spectrum band. The base station wireless communication management module 1260, or portions of it, may include a processor, and/or some or all of the functions of the base station wireless communication management module 1260 may be performed by the base station processor module 1210 and/or in connection with the base station processor module 1210. In some examples, the base station wireless communication management module 1260 may be an example of the wireless communication management module 720, 820, and/or 920 described with reference to FIG. 7, 8, and/or 9.

Figure 13:
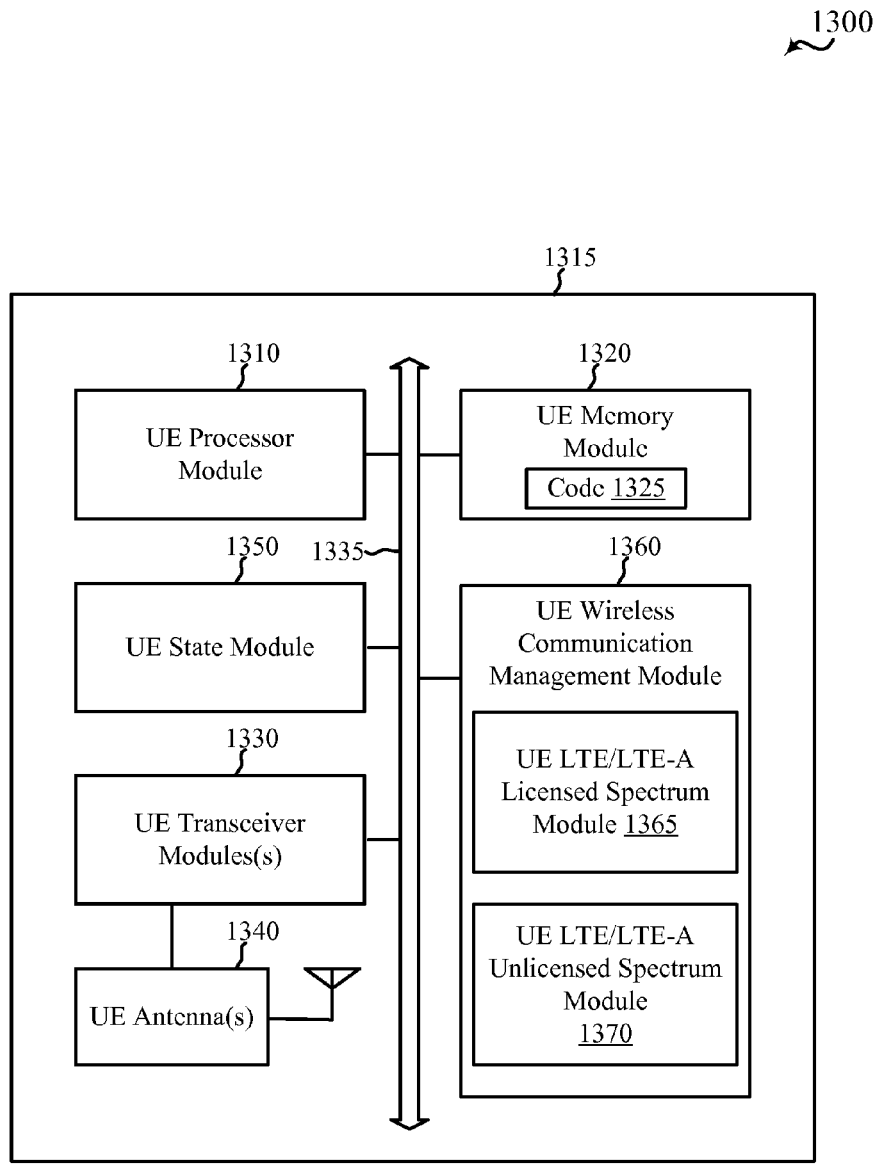
FIG. 13 shows a block diagram of a user equipment (UE) for use in wireless communication, in accordance with various aspects of the present disclosure.

FIG. 13 shows a block diagram 1300 of a UE 1315 for use in wireless communication, in accordance with various aspects of the present disclosure. The UE 1315 may have various configurations and may be or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 1315 may, in some examples, have an internal power supply (not shown), such as a small battery, to facilitate mobile operation. In some examples, the UE 1315 may be an example of aspects of one or more of the UEs 115, 215, 215-*a*, 215-*b*, 215-*c*, and/or 315 described with reference to FIG. 1, 2, and/or 3, and/or aspects of one or more of the apparatuses 1015 and/or 1115 described with reference to FIG. 10 and/or 11. The UE 1315 may be configured to implement at least some of the UE and/or apparatus features and functions described with reference to FIG. 1, 2, 3, 4, 5, 6, 10, and/or 11.

The UE 1315 may include a UE processor module 1310, a UE memory module 1320, at least one UE transceiver module (represented by UE transceiver module(s) 1330), at least one UE antenna (represented by UE antenna(s) 1340), and/or a UE wireless communication management module 1360. Each of these components may be in communication with each other, directly or indirectly, over one or more buses 1335.

The UE memory module 1320 may include RAM and/or ROM. The UE memory module 1320 may store computer-readable, computer-executable code 1325 containing instructions that are configured to, when executed, cause the UE processor module 1310 to perform various functions described herein related to wireless communication (e.g., functions relating to the transmission of data over an unlicensed radio frequency spectrum in accordance with an agreement between operators, etc.). Alternatively, the code 1325 may not be directly executable by the UE processor module 1310 but be configured to cause the UE 1315 (e.g., when compiled and executed) to perform various of the functions described herein.

The UE processor module 1310 may include an intelligent hardware device, e.g., a CPU, a microcontroller, an ASIC, etc. The UE processor module 1310 may process information received through the UE transceiver module(s) 1330 and/or information to be sent to the UE transceiver module(s) 1330 for transmission through the UE antenna(s) 1340. The UE processor module 1310 may handle, alone or in connection with the UE wireless communication management module 1360, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., a radio frequency spectrum band for which apparatuses may need to contend for access because the radio frequency spectrum band is available, at least in part, for unlicensed use, such as Wi-Fi use and/or unlicensed LTE/LTE-A use).

The UE transceiver module(s) 1330 may include a modem configured to modulate packets and provide the modulated packets to the UE antenna(s) 1340 for transmission, and to demodulate packets received from the UE antenna(s) 1340. The UE transceiver module(s) 1330 may, in some examples, be implemented as one or more UE transmitter modules and one or more separate UE receiver modules. The UE transceiver module(s) 1330 may support communications in the first radio frequency spectrum band and/or the second radio frequency spectrum band. The UE transceiver module(s) 1330 may be configured to communicate bi-directionally, via the UE antenna(s) 1340, with one or more of the base stations 105, 205, 205-*a*, 305, 305-*a*, and/or 1205 described with reference to FIG. 1, 2, 3, and/or 12, and/or one or more of the apparatuses 705, 805, and/or 905 described with reference to FIG. 7, 8, and/or 9. While the UE 1315 may include a single UE antenna, there may be examples in which the UE 1315 may include multiple UE antennas 1340.

The UE state module 1350 may be used, for example, to manage transitions of the UE 1315 between an RRC idle state and an RRC connected state, and may be in communication with other components of the UE 1315, directly or indirectly, over the one or more buses 1335. The UE state module 1350, or portions of it, may include a processor, and/or some or all of the functions of the UE state module 1350 may be performed by the UE processor module 1310 and/or in connection with the UE processor module 1310.

The UE wireless communication management module 1360 may be configured to perform and/or control some or all of the features and/or functions described with reference to FIG. 1, 2, 3, 4, 5, 6, 10, and/or 11 related to wireless communication over the first radio frequency spectrum band and/or the second radio frequency spectrum band (e.g., functions relating to the transmission of data over the second (or unlicensed) radio frequency spectrum band in accordance with an agreement between operators, etc.). In some examples, the UE wireless communication management module 1360 may be configured to support a supplemental downlink mode, a carrier aggregation mode, and/or a standalone mode using the first spectrum and/or the second spectrum. The UE wireless communication management module 1360 may include a UE LTE/LTE-A licensed spectrum module 1365 configured to handle LTE/LTE-A communications in the first radio frequency spectrum band, and a UE LTE/LTE-A unlicensed spectrum module 1370 configured to handle LTE/LTE-A communications in the second radio frequency spectrum band. The UE wireless communication management module 1360, or portions of it, may include a processor, and/or some or all of the functions of the UE wireless communication management module 1360 may be performed by the UE processor module 1310 and/or in connection with the UE processor module 1310. In some examples, the UE wireless communication management module 1360 may be an example of the wireless communication management module 1020 and/or 1120 described with reference to FIG. 10 and/or 11.

Figure 14:
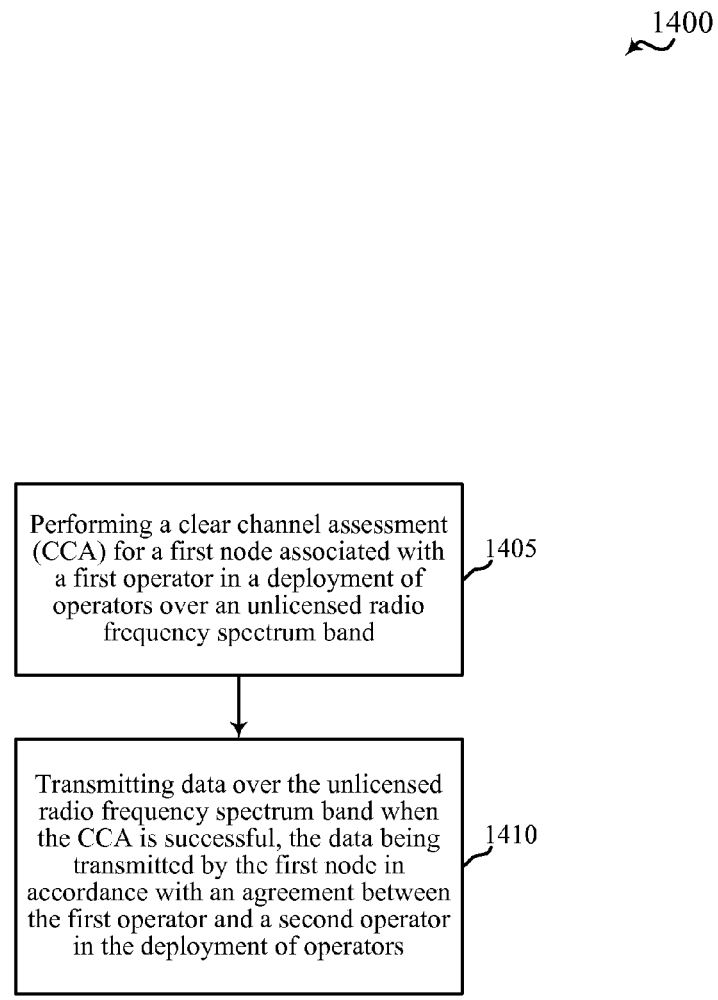
FIG. 14 is a flow chart illustrating an example of a method of wireless communication, in accordance with various aspects of the present disclosure.

FIG. 14 is a flow chart illustrating an example of a method 1400 of wireless communication, in accordance with various aspects of the present disclosure. For clarity, the method 1400 is described below with reference to aspects of one or more of the base stations 105, 205, 205-*a*, 305, 305-*a*, and/or 1205 described with reference to FIG. 1, 2, 3, and/or 12, and/or aspects of one or more of the apparatuses 705, 805, and/or 905 described with reference to FIG. 7, 8, and/or 9. In some examples, a base station and/or apparatus may execute one or more sets of codes to control the functional elements of the base station and/or apparatus to perform the functions described below.

At block 1405, the method 1400 may include performing a CCA for a first node associated with a first operator in a deployment of operators over an unlicensed radio frequency spectrum band. The unlicensed radio frequency spectrum band may be a radio frequency spectrum band for which nodes may need to contend for access because the radio frequency spectrum band is available, at least in part, for unlicensed use (e.g., Wi-Fi use and/or unlicensed LTE/LTE-A use). The first node may in some examples be or include an LTE/LTE-A eNB and/or an LTE/LTE-A base station. The operation(s) at block 1405 may be performed using the wireless communication management module 720, 820, 920, and/or 1260 described with reference to FIG. 7, 8, 9, and/or 12, and/or the CCA module 735, 845, and/or 945 described with reference to FIG. 7, 8, and/or 9.

At block 1410, the method 1400 may include transmitting data over the unlicensed radio frequency spectrum band when the CCA is successful. The data may be transmitted by the first node, in accordance with an agreement between the first operator and a second operator in the deployment of operators. In some examples, the first operator and the second operator may be or include different PLMNs. In some examples, the transmission of the data subject to the agreement may be part of at least one of an MBMS transmission, a unicast transmission, and/or a CoMP transmission by the first node and the second node.

In some examples, the agreement between the first operator and the second operator may include a predefined agreement and/or an opportunistic agreement. A predefined agreement may specify, in some examples, that the first operator (and/or one or more nodes of the first operator including the first node) will attempt to transmit the data subject to the agreement when a node of the first operator (e.g., the first node) gains access to the unlicensed radio frequency spectrum band and is able to transmit the data subject to the agreement (e.g., when the first node gains access to the unlicensed radio frequency spectrum band during an MBSFN frame). An opportunistic agreement may specify, in some examples, that the first operator (and/or one or more nodes of the first operator including the first node) will attempt to opportunistically transmit the data to assist the second operator. An opportunistic agreement may in some cases be based on a transmission status (or statuses) of one or more nodes (e.g., a second node) of the second operator. For example, an opportunistic agreement may specify that a node of the first operator (e.g., the first node) will attempt to transmit the data subject to the agreement 1) when the node of the first operator gains access to the unlicensed radio frequency spectrum band and is able to transmit the data subject to the agreement (e.g., when the first node gains access to the unlicensed radio frequency spectrum band during an MBSFN frame), and 2) during a frame for which the node of the first operator has detected that a node of the second operator (e.g., the second node) has transmitted, is transmitting, or will be transmitting the data subject to the agreement. As another example, an opportunistic agreement may specify that a node of the first operator (e.g., the first node) will attempt to transmit the data subject to the agreement 1) when the node of the first operator gains access to the unlicensed radio frequency spectrum band and is able to transmit the data subject to the agreement (e.g., when the first node gains access to the unlicensed radio frequency spectrum band during an MBSFN frame), and 2) during a frame for which the node of the first operator has detected that a node of the second operator (e.g., the second node) has not transmitted, is not transmitting, and will not be transmitting the data.

The operation(s) at block 1410 may be performed using the wireless communication management module 720, 820, 920, and/or 1260 described with reference to FIG. 7, 8, 9, and/or 12, and/or the data transmission management module 740, 850, and/or 955 described with reference to FIG. 7, 8, and/or 9.

Thus, the method 1400 may provide for wireless communication. It should be noted that the method 1400 is just one implementation and that the operations of the method 1400 may be rearranged or otherwise modified such that other implementations are possible.

Figure 15:
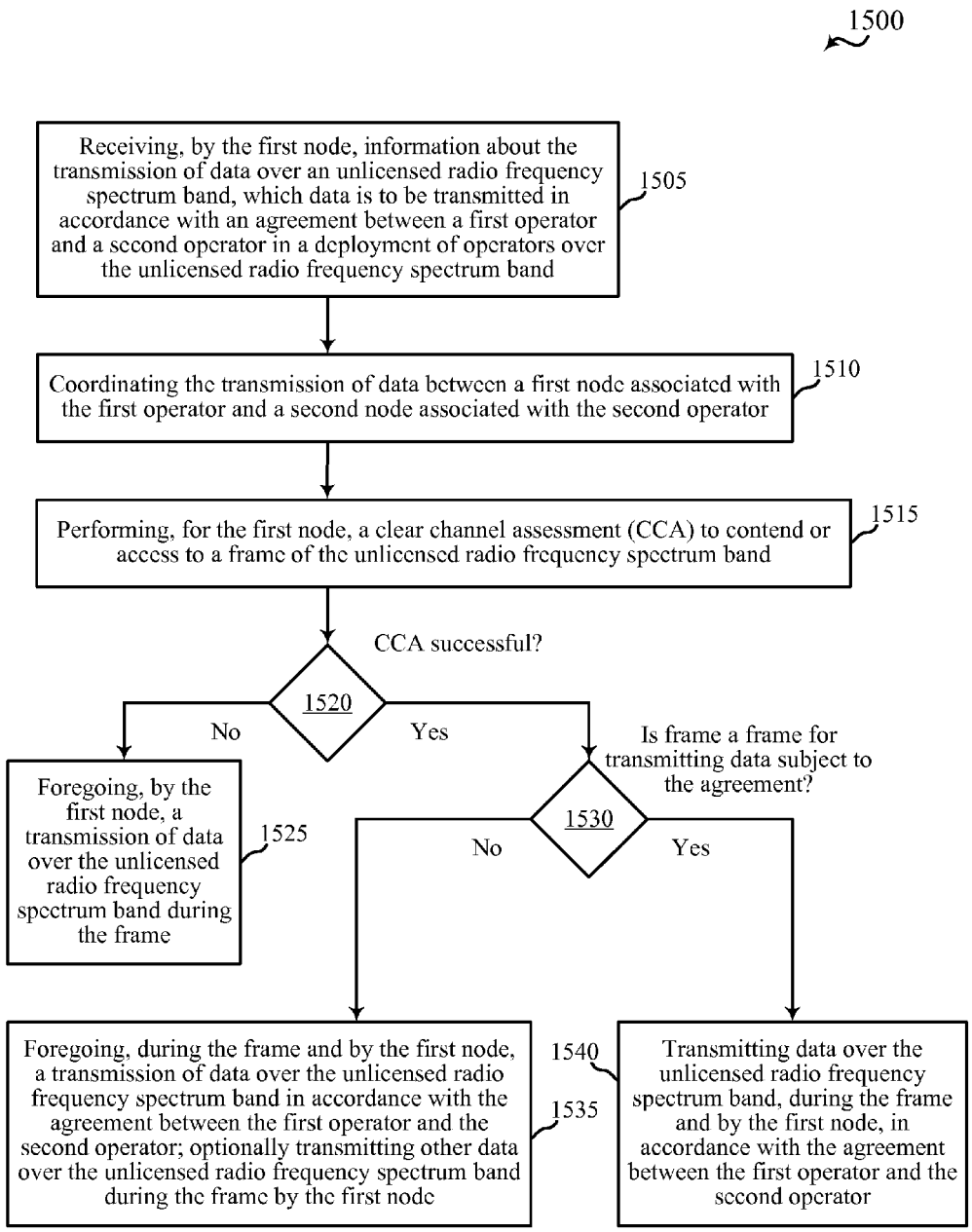
FIG. 15 is a flow chart illustrating an example of a method of wireless communication, in accordance with various aspects of the present disclosure.

FIG. 15 is a flow chart illustrating an example of a method 1500 of wireless communication, in accordance with various aspects of the present disclosure. For clarity, the method 1500 is described below with reference to aspects of one or more of the base stations 105, 205, 205-*a*, 305, 305-*a*, and/or 1205 described with reference to FIG. 1, 2, 3, and/or 12, and/or aspects of one or more of the apparatuses 705 and/or 805 described with reference to FIG. 7 and/or 8. In some examples, a base station and/or apparatus may execute one or more sets of codes to control the functional elements of the base station and/or apparatus to perform the functions described below.

At block 1505, the method 1500 may include receiving, by a first node associated with a first operator, information about a transmission of data over an unlicensed radio frequency band, which data is to be transmitted in accordance with an agreement between the first operator and a second operator in a deployment of operators over the unlicensed radio frequency spectrum band. The unlicensed radio frequency spectrum band may be a radio frequency spectrum band for which nodes may need to contend for access because the radio frequency spectrum band is available, at least in part, for unlicensed use (e.g., Wi-Fi use and/or unlicensed LTE/LTE-A use). In some examples, the first operator and the second operator may be or include different PLMNs.

In some examples of the method 1500, the agreement between the first operator and the second operator may include a predefined agreement. The predefined agreement may specify, for example, that the first operator (and/or one or more nodes of the first operator including the first node) will attempt to transmit the data subject to the agreement when a node of the first operator (e.g., the first node) gains access to the unlicensed radio frequency spectrum band and is able to transmit the data subject to the agreement (e.g., when the first node gains access to the unlicensed radio frequency spectrum band during an MBSFN frame). In the above description, and elsewhere in the description of FIG. 15, the second node may be a neighbor node of the first node. In some examples, at least one of the first node or the second node may be or include an LTE/LTE-A eNB and/or an LTE/LTE-A base station.

In some examples of the method 1500, the agreement between the first operator and the second operator may define a proportion of a bandwidth of the first node that is allocated to transmit the data subject to the agreement.

In some examples of the method 1500, the information about the transmission of the data may be received (e.g., at block 1505) from at least one of an OAM server, a multicast coordination entity of the first operator communicatively coupled with the second operator, a second node associated with the second operator, a third node associated with the first operator, a service information bulletin transmitted by the second node, or a multicast channel transmitted by the second node. In some examples, the information about the transmission of the data may include at least one of the data which is to be transmitted subject to the agreement, or configuration data for the transmission of the data.

The operation(s) at block 1505 may be performed using the wireless communication management module 720, 820, and/or 1260 described with reference to FIG. 7, 8, and/or 12, and/or the information reception module 835 described with reference to FIG. 8.

At block 1510, the method 1500 may include coordinating the transmission of the data between the first node and the second node. In some examples, the coordination may include determining an MCCH configuration to use to transmit the data, which MCCH configuration is common to the first node and the second node. In some examples, the coordination may also or alternately include determining a SYNC PDU to use to transmit the data, which SYNC PDU is common to the first node and the second node. In some examples, the MCCH configuration and/or the SYNC PDU may be determined based on signaling received via a core network (e.g., via a core network such as the core network 130 and/or 1245 described with reference to FIG. 1 and/or 12) and/or via the second node. In some examples, the coordination may include determining a frame to use to transmit the data, over which MBMS or unicast data from the first node and the second node is transmitted.

The coordination performed at block 1510 may also or alternately include determining, by the first node, a location for performing a CCA (e.g., one of the DCCA opportunities for performing the DCCA 540 described with reference to FIG. 5) for a frame of the unlicensed radio frequency spectrum band. In some examples, the location for performing the CCA may be aligned with a location of a CCA determined by the second node (e.g., the location for performing the CCA may be the same for the first node and the second node) and/or a location of a CCA determined by a core network (e.g., a core network such as the core network 130 and/or 1245). In other examples, the first node may independently or semi-independently determine a location for performing a CCA, based on a mapping function such as the mapping function described with reference to FIG. 4. In some examples, the first node may use different methods and/or functions to determine a location for performing a CCA for a frame of the unlicensed radio frequency spectrum band in which data subject to the agreement is to be transmitted (e.g., an MBSFN frame) versus a frame of the unlicensed radio frequency spectrum band in which other data is to be transmitted.

The operation(s) at block 1510 may be performed using the wireless communication management module 720, 820, and/or 1260 described with reference to FIG. 7, 8, and/or 12, and/or the transmission coordination module 840 described with reference to FIG. 8.

At block 1515, the method 1500 may include performing a CCA for the first node. The CCA may be performed to contend for access to the unlicensed radio frequency spectrum band. When it is determined at block 1520 that the CCA failed, the method 1500 may proceed to block 1525, where the method 1500 may include foregoing, by the first node, a transmission of data during the frame for which the CCA was performed. When it is determined at block 1520 that the CCA was successful, the method 1500 may proceed to block 1530. The operation(s) at block 1515 and/or 1520 may be performed using the wireless communication management module 720, 820, and/or 1260 described with reference to FIG. 7, 8, and/or 12, and/or the CCA module 735 and/or 845 described with reference to FIG. 7 and/or 8.

At block 1530, the method 1500 may include determining whether a frame for which CCA was successful is a frame for transmitting data subject to the agreement. In some examples, this may include determining whether the frame is an MBSFN frame. When it is determined at block 1530 that the frame for which CCA was successful is not a frame for transmitting data subject to the agreement, the method 1500 may proceed to block 1535, where the method 1500 may include foregoing, during the frame and by the first node, a transmission of the data subject to the agreement over the unlicensed radio frequency spectrum band. In some examples, the first node may transmit other data over the unlicensed radio frequency spectrum band (e.g., data not subject to the agreement between the first operator and the second operator) when not transmitting data in accordance with the agreement. When it is determined at block 1530 that the frame for which CCA was successful is a frame for transmitting data subject to the agreement, the method 1500 may proceed to block 1540.

At block 1540, the method 1500 may include transmitting data subject to the agreement over the unlicensed radio frequency spectrum, during the frame and by the first node, in accordance with the agreement between the first operator and the second operator. The data may in some cases be transmitted concurrent to a transmission of the data by the second node. In some examples, the transmission of the data subject to the agreement may be part of an MBMS transmission (e.g., a joint eMBMS transmission provided by the first node and the second node), a unicast transmission, and/or a CoMP transmission by the first node and the second node.

The operation(s) at block 1530, 1535, and/or 1540 may be performed using the wireless communication management module 720, 820, and/or 1260 described with reference to FIG. 7, 8, and/or 12, and/or the data transmission management module 740 and/or 850 described with reference to FIG. 7 and/or 8.

Thus, the method 1500 may provide for wireless communication. It should be noted that the method 1500 is just one implementation and that the operations of the method 1500 may be rearranged or otherwise modified such that other implementations are possible.

Figure 16:
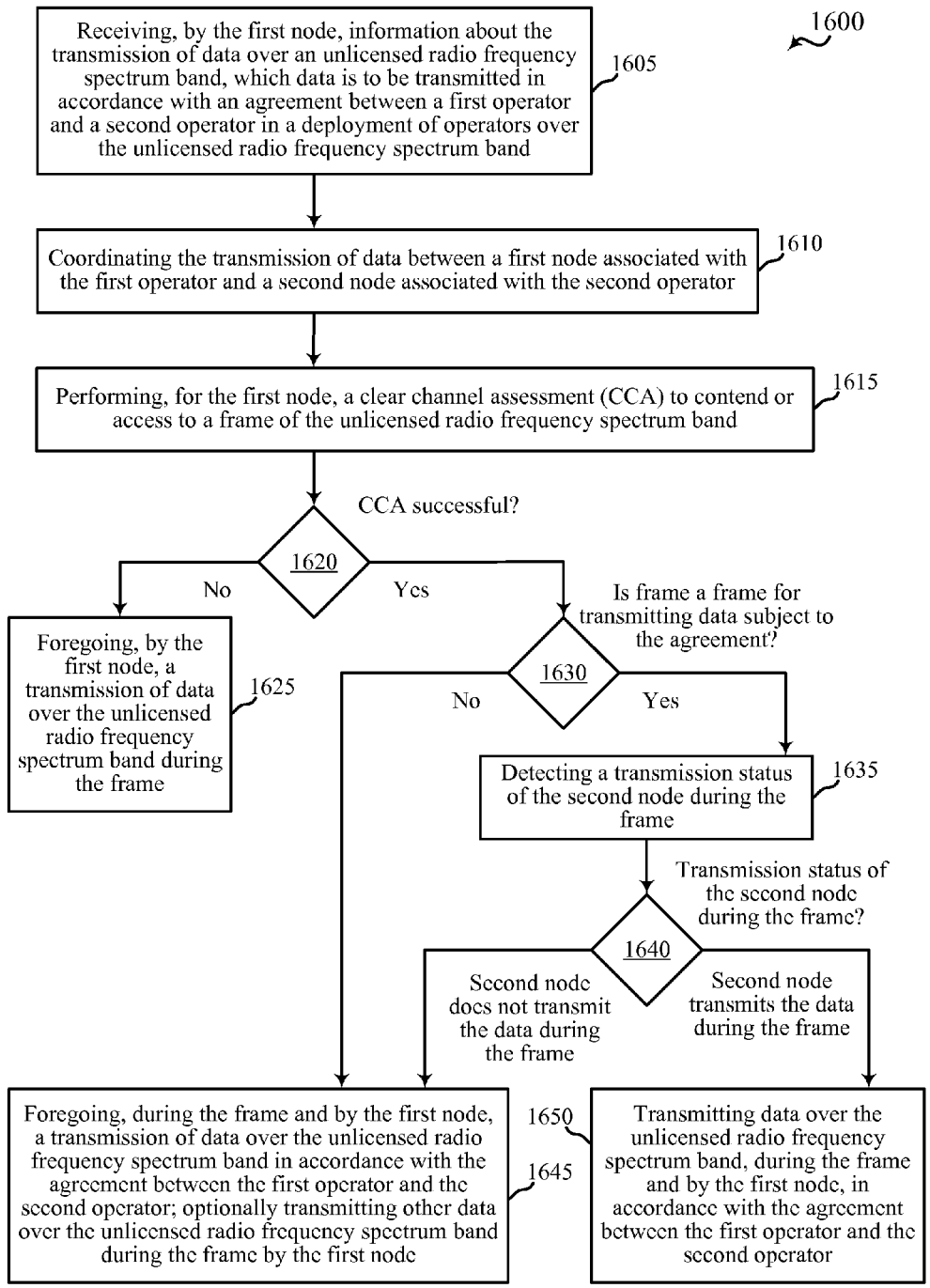
FIG. 16 is a flow chart illustrating an example of a method of wireless communication, in accordance with various aspects of the present disclosure.

FIG. 16 is a flow chart illustrating an example of a method 1600 of wireless communication, in accordance with various aspects of the present disclosure. For clarity, the method 1600 is described below with reference to aspects of one or more of the base stations 105, 205, 205-a, 305, 305-a, and/or 1205 described with reference to FIG. 1, 2, 3, and/or 12, and/or aspects of one or more of the apparatuses 705 and/or 905 described with reference to FIG. 7 and/or 9. In some examples, a base station and/or apparatus may execute one or more sets of codes to control the functional elements of the base station and/or apparatus to perform the functions described below.

At block 1605, the method 1600 may include receiving, by a first node associated with a first operator, information about a transmission of data over an unlicensed radio frequency band, which data is to be transmitted in accordance with an agreement between the first operator and a second operator in a deployment of operators over the unlicensed radio frequency spectrum band. The unlicensed radio frequency spectrum band may be a radio frequency spectrum band for which nodes may need to contend for access because the radio frequency spectrum band is available, at least in part, for unlicensed use (e.g., Wi-Fi use and/or unlicensed LTE/LTE-A use). In some examples, the first operator and the second operator may be or include different PLMNs.

In some examples of the method 1600, the agreement between the first operator and the second operator may include an opportunistic agreement. The opportunistic agreement may specify, for example, that the first operator (and/or one or more nodes of the first operator including the first node) will attempt to opportunistically transmit data to assist the second operator. An opportunistic agreement may in some cases be based on a transmission status (or statuses) of one or more nodes of the second operator (e.g., one or more nodes including a second node of the second operator). For example, an opportunistic agreement may specify that a node of the first operator (e.g., the first node) will attempt to transmit the data subject to the agreement 1) when the node of the first operator gains access to the unlicensed radio frequency spectrum band and is able to transmit the data subject to the agreement (e.g., when the node of the first operator gains access to the unlicensed radio frequency spectrum band during an MBSFN frame), and 2) during a frame for which the node of the first operator detects that a node of the second operator (e.g., the second node) has transmitted, is transmitting, or will be transmitting the data. In the above description and elsewhere in the description of FIG. 16, the second node may be considered a primary node (i.e., a node from which the data subject to the agreement is intended to be transmitted), and the first node may be considered a secondary node (i.e., a node from which the data intended to be transmitted from the second node is transmitted to assist the second operator with data transmissions). Also in the above description, and elsewhere in the description of FIG. 16, the second node may be a neighbor node of the first node. In some examples, at least one of the first node or the second node may be or include an LTE/LTE-A eNB and/or an LTE/LTE-A base station.

In some examples of the method 1600, the agreement between the first operator and the second operator may define a proportion of a bandwidth of the first node that is allocated to transmit the data subject to the agreement.

In some examples of the method 1600, the information about the transmission of the data may be received (e.g., at block 1605) from at least one of an OAM server, a multicast coordination entity of the first operator communicatively coupled with the second operator, a second node associated with the second operator, a third node associated with the first operator, a service information bulletin transmitted by the second node, or a multicast channel transmitted by the second node. In some examples, the information about the transmission of the data may include at least one of the data which is to be transmitted subject to the agreement, or configuration data for the transmission of the data.

The operation(s) at block 1605 may be performed using the wireless communication management module 720, 920, and/or 1260 described with reference to FIG. 7, 9, and/or 12, and/or the information reception module 935 described with reference to FIG. 9.

At block 1610, the method 1600 may include coordinating the transmission of the data between the first node and the second node. In some examples, the coordination may include determining an MCCH configuration to use to transmit the data, which MCCH configuration is common to the first node and the second node. In some examples, the coordination may also or alternately include determining a SYNC PDU to use to transmit the data, which SYNC PDU is common to the first node and the second node. In some examples, the MCCH configuration and/or the SYNC PDU may be determined based on signaling received via a core network (e.g., via a core network such as the core network 130 and/or 1245 described with reference to FIG. 1 and/or 12) and/or via the second node. In some examples, the coordination may include determining a frame to use to transmit the data, over which MBMS or unicast data from the first node and the second node is transmitted.

The coordination performed at block 1610 may also or alternately include determining, by the first node, a location for performing a CCA (e.g., one of the DCCA opportunities for performing the DCCA 540 described with reference to FIG. 5) for a frame of the unlicensed radio frequency spectrum band. In some examples, the location for performing the CCA may be aligned with a location of a CCA determined by the second node (e.g., the location for performing the CCA may be the same for the first node and the second node) and/or a location of a CCA determined by a core network (e.g., a core network such as the core network 130 and/or 1245). In other examples, the first node may independently or semi-independently determine a location for performing a CCA, based on a mapping function such as the mapping function described with reference to FIG. 4. In some examples, the first node may use different methods and/or functions to determine a location for performing a CCA for a frame of the unlicensed radio frequency spectrum band in which data subject to the agreement is to be transmitted (e.g., an MBSFN frame) versus a frame of the unlicensed radio frequency spectrum band in which other data is to be transmitted.

The operation(s) at block 1610 may be performed using the wireless communication management module 720, 920, and/or 1260 described with reference to FIG. 7, 9, and/or 12, and/or the transmission coordination module 940 described with reference to FIG. 9.

At block 1615, the method 1600 may include performing a CCA for the first node. The CCA may be performed to contend for access to the unlicensed radio frequency spectrum band. When it is determined at block 1620 that the CCA failed, the method 1600 may proceed to block 1625, where the method 1600 may include foregoing, by the first node, a transmission of data during the frame for which the CCA was performed. When it is determined at block 1620 that the CCA was successful, the method 1600 may proceed to block 1630. The operation(s) at block 1615 and/or 1620 may be performed using the wireless communication management module 720, 920, and/or 1260 described with reference to FIG. 7, 9, and/or 12, and/or the CCA module 735 and/or 945 described with reference to FIG. 7 and/or 9.

At block 1630, the method 1600 may include determining whether a frame for which CCA was successful is a frame for transmitting data subject to the agreement. In some examples, this may include determining whether the frame is an MBSFN frame. When it is determined at block 1630 that the frame for which CCA was successful is not a frame for transmitting data subject to the agreement, the method 1600 may proceed to block 1645. When it is determined at block 1630 that the frame for which CCA was successful is a frame for transmitting data subject to the agreement, the method 1600 may proceed to block 1635. The operation(s) at block 1630 may be performed using the wireless communication management module 720, 920, and/or 1260 described with reference to FIG. 7, 9, and/or 12, and/or the data transmission management module 740 and/or 955 described with reference to FIG. 7 and/or 9.

At block 1635 and/or 1640, the method 1600 may include determining, by the first node and based on a transmission status of the second node, whether to transmit the data subject to the agreement during the frame for which a successful CCA was performed at block 1615. For example, at block 1635, the method 1600 may include detecting a transmission status of the second node during the frame for which a CCA was performed at block 1615. When it is determined at block 1640 that the second node has not transmitted, is not transmitting, and will not be transmitting the data subject to the agreement during the frame (e.g., when an absence of a transmission of the data during the frame by the second node is detected), the method 1600 may proceed to block 1645, where the method 1600 may include foregoing, during the frame and by the first node, a transmission of the data subject to the agreement over the unlicensed radio frequency spectrum band. In some examples, the first node may transmit other data over the unlicensed radio frequency spectrum band (e.g., data not subject to the agreement between the first operator and the second operator) when not transmitting data in accordance with the agreement.

When it is determined at block 1640 that the second node has transmitted, is transmitting, or will be transmitting the data during the frame for which a successful CCA was performed at block 1615 (e.g., when a transmission of the data during the frame by the second node is detected), the method 1600 may proceed to block 1650.

In some examples, the transmission status of the second node, during the frame for which a successful CCA was performed at block 1615, may be detected based on a blind detection of a CUBS transmitted by the second node. For example, when the first node detects a CUBS of the second node corresponding to the frame, the first node may assume that a CCA of the second node corresponding to the frame succeeded, and that the second node will transmit the data subject to the agreement. However, when the first node does not detect a CUBS of the second node corresponding to the frame, the first node may assume that a CCA of the second node corresponding to the frame failed, and the first node may assume that the second node will not be transmitting the data subject to the agreement.

The operation(s) at block 1635 and/or 1640 may be performed using the wireless communication management module 720, 920, and/or 1260 described with reference to FIG. 7, 9, and/or 12, and/or the transmission status detection module 950 described with reference to FIG. 9. The operation(s) at block 1645 may be performed using the wireless communication management module 720, 920, and/or 1260 described with reference to FIG. 7, 9, and/or 12, and/or the data transmission management module 740 and/or 955 described with reference to FIG. 7 and/or 9.

At block 1650, the method 1600 may include transmitting data subject to the agreement over the unlicensed radio frequency spectrum, during the frame and by the first node, in accordance with the agreement between the first operator and the second operator. The data may be transmitted concurrent to a transmission of the data by the second node. In some examples, the transmission of the data subject to the agreement may be part of an MBMS transmission (e.g., a joint eMBMS transmission provided by the first node and the second node), a unicast transmission, and/or a CoMP transmission by the first node and the second node. The operation(s) at block 1650 may be performed using the wireless communication management module 720, 920, and/or 1260 described with reference to FIG. 7, 9, and/or 12, and/or the data transmission management module 740 and/or 955 described with reference to FIG. 7 and/or 9.

Thus, the method 1600 may provide for wireless communication. It should be noted that the method 1600 is just one implementation and that the operations of the method 1600 may be rearranged or otherwise modified such that other implementations are possible.

Figure 17:
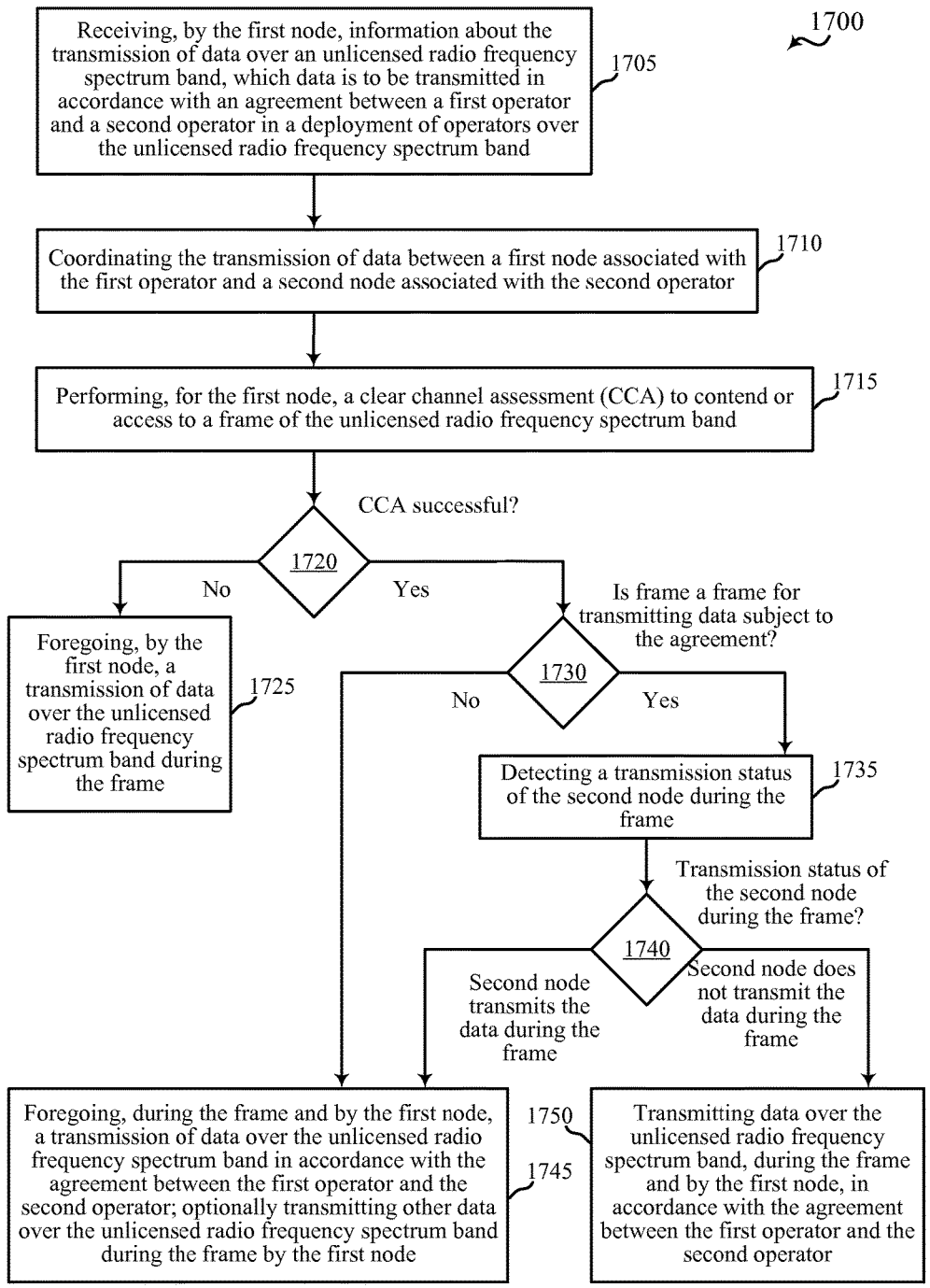
FIG. 17 is a flow chart illustrating an example of a method of wireless communication, in accordance with various aspects of the present disclosure.

FIG. 17 is a flow chart illustrating an example of a method 1700 of wireless communication, in accordance with various aspects of the present disclosure. For clarity, the method 1700 is described below with reference to aspects of one or more of the base stations 105, 205, 205-*a*, 305, 305-*a*, and/or 1205 described with reference to FIG. 1, 2, 3, and/or 12, and/or aspects of one or more of the apparatuses 705 and/or 905 described with reference to FIG. 7 and/or 9. In some examples, a base station and/or apparatus may execute one or more sets of codes to control the functional elements of the base station and/or apparatus to perform the functions described below.

At block 1705, the method 1700 may include receiving, by a first node associated with a first operator, information about a transmission of data over an unlicensed radio frequency band, which data is to be transmitted in accordance with an agreement between the first operator and a second operator in a deployment of operators over the unlicensed radio frequency spectrum band. The unlicensed radio frequency spectrum band may be a radio frequency spectrum band for which nodes may need to contend for access because the radio frequency spectrum band is available, at least in part, for unlicensed use (e.g., Wi-Fi use and/or unlicensed LTE/LTE-A use). In some examples, the first operator and the second operator may be or include different PLMNs.

In some examples of the method 1700, the agreement between the first operator and the second operator may include an opportunistic agreement. The opportunistic agreement may specify, for example, that the first operator (and/or one or more nodes of the first operator including the first node) will attempt to opportunistically transmit data to assist the second operator. An opportunistic agreement may in some cases be based on a transmission status (or statuses) of one or more nodes of the second operator (e.g., one or more nodes including a second node of the second operator). For example, an opportunistic agreement may specify that a node of the first operator (e.g., the first node) will attempt to transmit the data subject to the agreement 1) when the node of the first operator gains access to the unlicensed radio frequency spectrum band and is able to transmit the data subject to the agreement (e.g., when the node of the first operator gains access to the unlicensed radio frequency spectrum band during an MBSFN frame), and 2) during a frame for which the node of the first operator detects that a node of the second operator (e.g., the second node) has not transmitted, is not transmitting, and will not be transmitting the data. In the above description and elsewhere in the description of FIG. 17, the second node may be considered a primary node (i.e., a node from which the data subject to the agreement is intended to be transmitted), and the first node may be considered a secondary node (i.e., a node from which the data intended to be transmitted from the second node is transmitted to assist the second operator with data transmissions when the second node is unable to make the data transmissions). Also in the above description, and elsewhere in the description of FIG. 17, the second node may be a neighbor node of the first node. In some examples, at least one of the first node or the second node may be or include an LTE/LTE-A eNB and/or an LTE/LTE-A base station.

In some examples of the method 1700, the agreement between the first operator and the second operator may define a proportion of a bandwidth of the first node that is allocated to transmit the data subject to the agreement.

In some examples of the method 1700, the information about the transmission of the data may be received (e.g., at block 1705) from at least one of an OAM server, a multicast coordination entity of the first operator communicatively coupled with the second operator, a second node associated with the second operator, a third node associated with the first operator, a service information bulletin transmitted by the second node, or a multicast channel transmitted by the second node. In some examples, the information about the transmission of the data may include at least one of the data which is to be transmitted subject to the agreement, or configuration data for the transmission of the data.

The operation(s) at block 1705 may be performed using the wireless communication management module 720, 920, and/or 1260 described with reference to FIG. 7, 9, and/or 12, and/or the information reception module 935 described with reference to FIG. 9.

At block 1710, the method 1700 may include coordinating the transmission of the data between the first node and the second node. In some examples, the coordination may include determining an MCCH configuration to use to transmit the data, which MCCH configuration is common to the first node and the second node. In some examples, the coordination may also or alternately include determining a SYNC PDU to use to transmit the data, which SYNC PDU is common to the first node and the second node. In some examples, the MCCH configuration and/or the SYNC PDU may be determined based on signaling received via a core network (e.g., via a core network such as the core network 130 and/or 1245 described with reference to FIG. 1 and/or 12) and/or via the second node. In some examples, the coordination may include determining a frame to use to transmit the data, over which MBMS or unicast data from the first node and the second node is transmitted.

The coordination performed at block 1710 may also or alternately include determining, by the first node, a location for performing a CCA (e.g., one of the DCCA opportunities for performing the DCCA 540 described with reference to FIG. 5) for a frame of the unlicensed radio frequency spectrum band. In some examples, the location for performing the CCA may be aligned with a location of a CCA determined by the second node (e.g., the location for performing the CCA may be the same for the first node and the second node) and/or a location of a CCA determined by a core network (e.g., a core network such as the core network 130 and/or 1245). In other examples, the first node may independently or semi-independently determine a location for performing a CCA, based on a mapping function such as the mapping function described with reference to FIG. 4. In some examples, the first node may use different methods and/or functions to determine a location for performing a CCA for a frame of the unlicensed radio frequency spectrum band in which data subject to the agreement is to be transmitted (e.g., an MBSFN frame) versus a frame of the unlicensed radio frequency spectrum band in which other data is to be transmitted.

The operation(s) at block 1710 may be performed using the wireless communication management module 720, 920, and/or 1260 described with reference to FIG. 7, 9, and/or 12, and/or the transmission coordination module 940 described with reference to FIG. 9.

At block 1715, the method 1700 may include performing a CCA for the first node. The CCA may be performed to contend for access to the unlicensed radio frequency spectrum band. When it is determined at block 1720 that the CCA failed, the method 1700 may proceed to block 1725, where the method 1700 may include foregoing, by the first node, a transmission of data during the frame for which the CCA was performed. When it is determined at block 1720 that the CCA was successful, the method 1700 may proceed to block 1730. The operation(s) at block 1715 and/or 1720 may be performed using the wireless communication management module 720, 920, and/or 1260 described with reference to FIG. 7, 9, and/or 12, and/or the CCA module 735 and/or 945 described with reference to FIG. 7 and/or 9.

At block 1730, the method 1700 may include determining whether a frame for which CCA was successful is a frame for transmitting data subject to the agreement. In some examples, this may include determining whether the frame is an MBSFN frame. When it is determined at block 1730 that the frame for which CCA was successful is not a frame for transmitting data subject to the agreement, the method 1700 may proceed to block 1745. When it is determined at block 1730 that the frame for which CCA was successful is a frame for transmitting data subject to the agreement, the method 1700 may proceed to block 1735. The operation(s) at block 1730 may be performed using the wireless communication management module 720, 920, and/or 1260 described with reference to FIG. 7, 9, and/or 12, and/or the data transmission management module 740 and/or 955 described with reference to FIG. 7 and/or 9.

At block 1735 and/or 1740, the method 1700 may include determining, by the first node and based on a transmission status of the second node, whether to transmit the data subject to the agreement during the frame for which a successful CCA was performed at block 1715. For example, at block 1735, the method 1700 may include detecting a transmission status of the second node during the frame for which a CCA was performed at block 1715. When it is determined at block 1740 that the second node has transmitted, is transmitting, or will be transmitting the data subject to the agreement during the frame (e.g., when a transmission of the data during the frame by the second node is detected), the method 1700 may proceed to block 1745, where the method 1700 may include foregoing, during the frame and by the first node, a transmission of the data subject to the agreement over the unlicensed radio frequency spectrum band. In some examples, the first node may transmit other data over the unlicensed radio frequency spectrum band (e.g., data not subject to the agreement between the first operator and the second operator) when not transmitting data in accordance with the agreement. In some examples, the other data may be transmitted at a lower power to avoid interference with a transmission of the data subject to the agreement by the second node. In some examples, the power at which the other data is transmitted may be set based on a detected signal power of the second node (e.g., a signal power at which a CUBS of the second node is transmitted).

When it is determined at block 1740 that the second node has not transmitted, is not transmitting, and will not be transmitting the data during the frame for which a successful CCA was performed at block 1715 (e.g., when an absence of a transmission of the data during the frame by the second node is detected), the method 1700 may proceed to block 1750.

In some examples, the transmission status of the second node, during the frame for which a successful CCA was performed at block 1715, may be detected based on a blind detection of a CUBS transmitted by the second node. For example, when the first node detects a CUBS of the second node corresponding to the frame, the first node may assume that a CCA of the second node corresponding to the frame succeeded, and that the second node will transmit the data subject to the agreement. However, when the first node does not detect a CUBS of the second node corresponding to the frame, the first node may assume that a CCA of the second node corresponding to the frame failed, and the first node may assume that the second node will not be transmitting the data subject to the agreement.

The operation(s) at block 1735 and/or 1740 may be performed using the wireless communication management module 720, 920, and/or 1260 described with reference to FIG. 7, 9, and/or 12, and/or the transmission status detection module 950 described with reference to FIG. 9. The operation(s) at block 1745 may be performed using the wireless communication management module 720, 920, and/or 1260 described with reference to FIG. 7, 9, and/or 12, and/or the data transmission management module 740 and/or 955 described with reference to FIG. 7 and/or 9.

At block 1750, the method 1700 may include transmitting data subject to the agreement over the unlicensed radio frequency spectrum, during the frame and by the first node, in accordance with the agreement between the first operator and the second operator. In some examples, the transmission of the data subject to the agreement may be part of an MBMS transmission (e.g., a joint eMBMS transmission provided by the first node and the second node), a unicast transmission, and/or a CoMP transmission by the first node and the second node. The operation(s) at block 1750 may be performed using the wireless communication management module 720, 920, and/or 1260 described with reference to FIG. 7, 9, and/or 12, and/or the data transmission management module 740 and/or 955 described with reference to FIG. 7 and/or 9.

Thus, the method 1700 may provide for wireless communication. It should be noted that the method 1700 is just one implementation and that the operations of the method 1700 may be rearranged or otherwise modified such that other implementations are possible.

In some examples, aspects of one or more of the methods 1400, 1500, 1600, and/or 1700 may be combined.

FIG. 18 is a flow chart illustrating an example of a method 1800 of wireless communication, in accordance with various aspects of the present disclosure. For clarity, the method 1800 is described below with reference to aspects of one or more of the UEs 115, 215, 215-*a*, 215-*b*, 215-*c*, 315, and/or 1315 described with reference to FIG. 1, 2, 3, and/or 13, and/or aspects of one or more of the apparatuses 1015 and/or 1115 described with reference to FIG. 10 and/or 11. In some examples, a UE and/or apparatus may execute one or more sets of codes to control the functional elements of the UE and/or apparatus to perform the functions described below.

At block 1805, the method 1800 may include receiving over an unlicensed radio frequency spectrum band, at a UE, a first transmission from a first node associated with a first operator in a deployment of operators. The first transmission may include data originating from a second operator in the deployment of operators. In some examples, the first transmission may include data transmitted by the first node in accordance with an agreement between the first operator and a second operator in the deployment of operators. The unlicensed radio frequency spectrum band may be a radio frequency spectrum band for which nodes may need to contend for access because the radio frequency spectrum band is available, at least in part, for unlicensed use (e.g., Wi-Fi use and/or unlicensed LTE/LTE-A use). In some examples, the first operator and the second operator may be or include different PLMNs. The first node may in some examples be or include an LTE/LTE-A eNB and/or an LTE/LTE-A base station. In some examples, the first node may be an example of aspects of one or more of the base stations 105, 205, 205-a, 305, 305-a, and/or 1205 described with reference to FIG. 1, 2, 3, and/or 12, and/or an example of aspects of one or more of the apparatuses 705, 805, and/or 905 described with reference to FIG. 7, 8, and/or 9. The operation(s) at block 1805 may be performed using the wireless communication management module 1020, 1120, and/or 1360 described with reference to FIG. 10, 11, and/or 13, and/or the data reception management module 1035 and/or 1135 described with reference to FIG. 10 and/or 11.

In some examples of the method 1800, the UE may be connected to a second node associated with the second operator. The second node may in some examples be or include a second LTE/LTE-A eNB and/or a second LTE/LTE-A base station.

Thus, the method 1800 may provide for wireless communication. It should be noted that the method 1800 is just one implementation and that the operations of the method 1800 may be rearranged or otherwise modified such that other implementations are possible.

Figure 19:
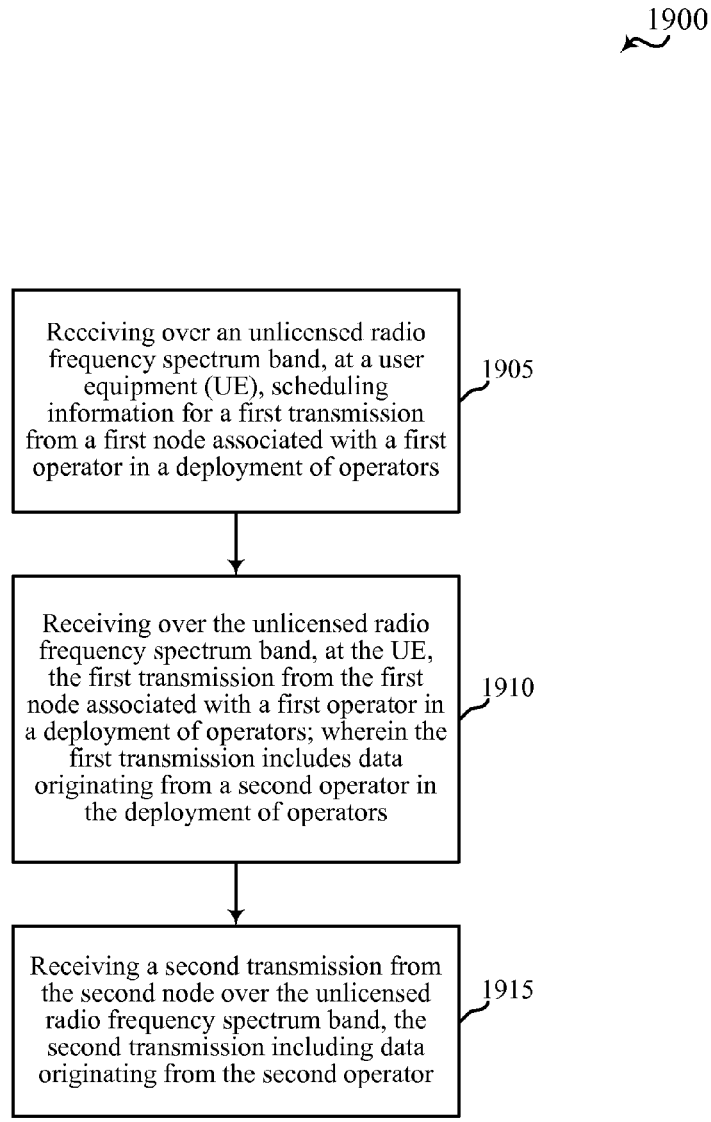
FIG. 19 is a flow chart illustrating an example of a method of wireless communication, in accordance with various aspects of the present disclosure.

FIG. 19 is a flow chart illustrating an example of a method 1900 of wireless communication, in accordance with various aspects of the present disclosure. For clarity, the method 1900 is described below with reference to aspects of one or more of the UEs 115, 215, 215-a, 215-b, 215-c, 315, and/or 1315 described with reference to FIG. 1, 2, 3, and/or 13, and/or aspects of one or more of the apparatuses 1015 and/or 1115 described with reference to FIG. 10 and/or 11. In some examples, a UE and/or apparatus may execute one or more sets of codes to control the functional elements of the UE and/or apparatus to perform the functions described below.

At block 1905, the method 1900 may include receiving scheduling information for a first transmission. The scheduling information may be received, for example, at a UE. The first transmission may be a transmission from a first node associated with a first operator in a deployment of operators, while the scheduling information may be received from a second node associated with a second operator. The scheduling information may be received prior to the first transmission. The scheduling information may, in some examples, be received over at least one of a licensed radio frequency spectrum band and/or an unlicensed radio frequency spectrum band. The licensed radio frequency spectrum band may be a radio frequency spectrum band for which apparatuses do not contend for access because the radio frequency spectrum band is licensed to particular users (e.g., LTE/LTE-A users) for particular uses. The unlicensed radio frequency spectrum band may be a radio frequency spectrum band for which nodes may need to contend for access because the radio frequency spectrum band is available, at least in part, for unlicensed use (e.g., Wi-Fi use and/or unlicensed LTE/LTE-A use). In some examples, the first operator and the second operator may be or include different PLMNs. The first node and/or the second node may, in some examples, be or include respective LTE/LTE-A eNBs and/or an LTE/LTE-A base stations. In some examples, the first node may be an example of aspects of one or more of the base stations 105, 205, 205-a, 305, 305-a, and/or 1205 described with reference to FIG. 1, 2, 3, and/or 12, and/or an example of aspects of one or more of the apparatuses 705, 805, and/or 905 described with reference to FIG. 7, 8, and/or 9. The operation(s) at block 1905 may be performed using the wireless communication management module 1020, 1120, and/or 1360 described with reference to FIG. 10, 11, and/or 13, and/or the scheduling information management module 1140 described with reference to FIG. 11.

At block 1910, the method 1900 may include receiving the first transmission from the first node. The first transmission may be received over the unlicensed radio frequency spectrum band, at the UE that received the scheduling information at block 1905. The first transmission may include data originating from the second operator (and in some examples, data originating from the second node). The first transmission may also include data transmitted by the first node in accordance with an agreement between the first operator and a second operator in the deployment of operators. The operation(s) at block 1910 may be performed using the wireless communication management module 1020, 1120, and/or 1360 described with reference to FIG. 10, 11, and/or 13, and/or the data reception management module 1035 and/or 1135 described with reference to FIG. 10 and/or 11.

In some examples of the method 1900, the UE receiving the scheduling information and the first transmission may be connected to the second node associated with the second operator. In these examples, and at block 1915, the method 1900 may include receiving a second transmission from the second node over the unlicensed radio frequency spectrum band. The second transmission may include data originating from the second operator. In some examples, the first transmission and the second transmission may be received concurrently. In some examples, at least one of the first transmission and/or the second transmission may be part of at least one of an MBMS transmission, a unicast transmission, and/or a CoMP transmission by the first node and the second node. In some examples, a first portion of the data originating from the second operator may be received from the first node during a first frame of the unlicensed radio frequency spectrum band, and a second portion of the data originating from the second operator may be received from the second node during a second frame of the unlicensed radio frequency spectrum band and/or the licensed radio frequency spectrum band. In some examples, the first frame may be received before the second frame. In other examples, the second frame may be received before the first frame. In other examples, the first frame and the second frame may be received concurrently. The operation(s) at block 1915 may be performed using the wireless communication management module 1020, 1120, and/or 1360 described with reference to FIG. 10, 11, and/or 13, and/or the data reception management module 1035 and/or 1135 described with reference to FIG. 10 and/or 11.

Thus, the method 1900 may provide for wireless communication. It should be noted that the method 1900 is just one implementation and that the operations of the method 1900 may be rearranged or otherwise modified such that other implementations are possible.

In some examples, aspects of one or more of the methods 1800 and 1900 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, electrically erasable programmable ROM (EEPROM), compact disk (CD)-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method of wireless communication, comprising:
performing, for a first node associated with a first operator in a deployment of operators, a clear channel assessment (CCA) associated with data at the first node over an unlicensed radio frequency spectrum band, wherein the deployment of operators comprises a second operator associated with a second node;
determining that a CCA of the second node for a frame associated with transmission of the data at the first node has failed; and
transmitting data over the unlicensed radio frequency spectrum band when the CCA is successful; the data being transmitted by the first node in accordance with an agreement between the first operator and the second operator and based on the determination that the CCA of the second node has failed.

2. The method of claim 1, further comprising:
determining, by the first node, a location of the CCA for a frame associated with the transmission of the data; wherein the location of the CCA for the frame is the same for the first node and the second node.

3. The method of claim 1, wherein the first node transmits the data concurrent to a transmission of the data by the second node when a CCA of the second node for a frame associated with the transmission of the data succeeds.

4. The method of claim 1, wherein the first node uses a multicast control channel (MCCH) configuration to transmit the data, and wherein the MCCH configuration is common to the first node and the second node.

5. The method of claim 1, wherein the first node uses a synchronization protocol data unit (SYNC PDU) to transmit the data, and wherein the SYNC PDU is common to the first node and the second node.

6. The method of claim 1, wherein the transmission of the data is part of at least one of: a multimedia broadcast multicast service (MBMS) transmission, a unicast transmission, or a coordinated multipoint (CoMP) transmission by the first node and the second node.

7. The method of claim 1, further comprising:
determining, by the first node and based on a transmission status of the second node, whether to transmit the data during a frame of the unlicensed radio frequency spectrum band for which the CCA is successful.

8. The method of claim 7, further comprising:
transmitting the data by the first node during the frame in response to detecting a transmission of the data by the second node.

9. The method of claim 7, further comprising:
transmitting the data by the first node during the frame in response to detecting an absence of a transmission by the second node of the data during the frame.

10. The method of claim 1, wherein the agreement between the first operator and the second operator defines a proportion of a bandwidth of the first node that is allocated to transmit the data.

11. The method of claim 1, wherein the agreement between the first operator and the second operator comprises at least one of: a predefined agreement or an opportunistic agreement.

12. The method of claim 1, further comprising:
receiving, by the first node, information about the transmission of the data, the information being received from at least one of: an operation, administration, and maintenance (OAM) server, a multicast coordination entity of the first operator communicatively coupled with the second operator, a second node associated with the second operator, a third node associated with the first operator, a service information bulletin transmitted by the second node, or a multicast channel transmitted by the second node.

13. The method of claim 12, wherein the information about the transmission of the data comprises at least one of: the data or configuration data for the transmission of the data.

14. An apparatus for wireless communication, comprising:
means for performing, for a first node associated with a first operator in a deployment of operators, a clear channel assessment (CCA) associated with data at the first node over an unlicensed radio frequency spectrum band, wherein the deployment of operators comprises a second operator associated with a second node;
means for determining that a CCA of the second node for a frame associated with transmission of the data at the first node has failed; and
means for transmitting data over the unlicensed radio frequency spectrum band when the CCA is successful; the data being transmitted by the first node in accordance with an agreement between the first operator and the second operator and based on the determination that the CCA of the second node has failed.

15. The apparatus of claim 14, further comprising:
means for determining, by the first node, a location of the CCA for a frame associated with the transmission of the data;
wherein the location of the CCA for the frame is the same for the first node and the second node.

16. The apparatus of claim 14, wherein the first node transmits the data concurrent to a transmission of the data by the second node when a CCA of the second node for a frame associated with the transmission of the data succeeds.

17. An apparatus for wireless communication, comprising:
a processor; and
memory couple to the processor, wherein the processor is configured to:
perform, for a first node associated with a first operator in a deployment of operators, a clear channel assessment (CCA) associated with data at the first node over an unlicensed radio frequency spectrum band, wherein the deployment of operators comprises a second operator associated with a second node;
determine that a CCA of the second node for a frame associated with transmission of the data at the first node has failed; and
transmit data over the unlicensed radio frequency spectrum band when the CCA is successful; the data being transmitted by the first node in accordance with an agreement between the first operator and the second operator and based on the determination that the CCA of the second node has failed.

18. The apparatus of claim 17, wherein the processor is configured to:
determine, by the first node, a location of the CCA for a frame associated with the transmission of the data;
wherein the location of the CCA for the frame is the same for the first node and the second node.

19. The apparatus of claim 17, wherein the first node transmits the data concurrent to a transmission of the data by the second node when a CCA of the second node for a frame associated with the transmission of the data succeeds.

20. The apparatus of claim 17, wherein the first node uses a multicast control channel (MCCH) configuration to transmit the data, and wherein the MCCH configuration is common to the first node and the second node.

21. The apparatus of claim 17, wherein the transmission of the data is part of at least one of: a multimedia broadcast multicast service (MBMS) transmission, a unicast transmission, or a coordinated multipoint (CoMP) transmission by the first node and the second node.

22. A non-transitory computer-readable medium for storing instructions executable by a processor, comprising:
instructions to perform, for a first node associated with a first operator in a deployment of operators, a clear channel assessment (CCA) associated with data at the first node over an unlicensed radio frequency spectrum band, wherein the deployment of operators comprises a second operator associated with a second node;
instructions to determine that a CCA of the second node for a frame associated with transmission of the data at the first node has failed; and
instructions to transmit data over the unlicensed radio frequency spectrum band when the CCA is successful; the data being transmitted by the first node in accordance with an agreement between the first operator and the second operator and based on the determination that the CCA of the second node has failed.

23. The non-transitory computer-readable medium of claim 22, wherein the transmission of the data is part of at least one of: a multimedia broadcast multicast service (MBMS) transmission, a unicast transmission, or a coordinated multipoint (CoMP) transmission by the first node and the second node.

24. The method of claim 1, further comprising:
coordinating the transmission of the data between the first node and the second node.

25. The apparatus of claim 14, further comprising:
means for coordinating the transmission of the data between the first node and the second node.

26. The apparatus of claim 17, wherein the processor is configured to:
coordinate the transmission of the data between the first node and the second node.

27. The non-transitory computer-readable medium of claim 22, wherein the instructions are executable by the processor to:
coordinate the transmission of the data between the first node and the second node.

* * * * *